(12) United States Patent
Tippery et al.

(10) Patent No.: US 11,612,092 B1
(45) Date of Patent: *Mar. 28, 2023

(54) AGRICULTURAL SYSTEM HAVING ACTUATABLE WORK TOOL ASSEMBLIES

(71) Applicant: REALMFIVE, Inc., Lincoln, NE (US)

(72) Inventors: Steve R. Tippery, Gretna, NE (US); Brant Burkey, Denton, NE (US); Kyle Gerber, Senoia, GA (US); Heath Roehr, Lincoln, NE (US); Tim Adkins, Plattsmouth, NE (US)

(73) Assignee: REALMFIVE, INC., Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,085

(22) Filed: Aug. 12, 2020

Related U.S. Application Data

(63) Continuation-in-part of application No. 16/940,341, filed on Jul. 27, 2020, and a continuation-in-part of
(Continued)

(51) Int. Cl.
*A01B 39/06* (2006.01)
*A01B 3/50* (2006.01)
(Continued)

(52) U.S. Cl.
CPC ............... *A01B 39/06* (2013.01); *A01B 3/50* (2013.01); *A01B 5/16* (2013.01); *A01B 35/32* (2013.01);
(Continued)

(58) Field of Classification Search
CPC .... A01K 11/008; A01K 29/005; G06N 20/20; G06Q 50/02
See application file for complete search history.

(56) References Cited

U.S. PATENT DOCUMENTS 3,186,493 A 6/1965 Barry
3,841,717 A 10/1974 Parisotto et al.
(Continued)

FOREIGN PATENT DOCUMENTS

CA 2991473 A1 2/2017
CN 2884827 4/2007
(Continued)

OTHER PUBLICATIONS

Chinese Office Action for Chinese Application No. 2016800804077 dated Nov. 23, 2020, 12 pages.
(Continued)

*Primary Examiner* — Mussa A Shaawat
(74) *Attorney, Agent, or Firm* — Suiter Swantz pc llo

(57) ABSTRACT

An agricultural system comprising includes a support assembly having one or more support structures and one or more propulsion units coupled to the one or more support structures. The agricultural system includes one or more actuatable work tool assemblies having one or more measurement attachments configured to perform one or more measurements of at least one of one or more objects or one or more regions within an environment. The one or more actuatable work tool assemblies may be actuated by one or more actuation systems. The agricultural system may include a controller configured to cause one or more processors to direct the one or more actuation systems to actuate the one or more actuatable work tool assemblies position to perform one or more measurements of at least one of one or more objects or one or more regions within the environment.

28 Claims, 17 Drawing Sheets

Related U.S. Application Data application No. 16/390,736, filed on Apr. 22, 2019, now Pat. No. 10,932,450, which is a continuation of application No. 16/215,008, filed on Dec. 10, 2018, now Pat. No. 10,721,857, which is a continuation-in-part of application No. 15/384,132, filed on Dec. 19, 2016, now Pat. No. 10,149,422, which is a continuation of application No. 15/384,132, filed on Dec. 19, 2016, now Pat. No. 10,149,422.

(60) Provisional application No. 63/064,659, filed on Aug. 12, 2020, provisional application No. 62/885,694, filed on Aug. 12, 2019, provisional application No. 62/660,844, filed on Apr. 20, 2018, provisional application No. 62/368,080, filed on Jul. 28, 2016, provisional application No. 62/335,260, filed on May 12, 2016, provisional application No. 62/319,861, filed on Apr. 8, 2016, provisional application No. 62/269,770, filed on Dec. 18, 2015, provisional application No. 62/269,800, filed on Dec. 18, 2015.

(51) Int. Cl.
| | | |
|---|---|---|
| *A01B 5/16* | (2006.01) | |
| *A01B 35/32* | (2006.01) | |
| *A01B 51/02* | (2006.01) | |
| *A01B 69/00* | (2006.01) | |
| *A01B 79/02* | (2006.01) | |
| *A01B 69/04* | (2006.01) | |
| *A01B 71/02* | (2006.01) | |
| *A01B 76/00* | (2006.01) | |
| *A01C 21/00* | (2006.01) | |
| *A01G 25/09* | (2006.01) | |

(52) U.S. Cl.
CPC ............ *A01B 51/02* (2013.01); *A01B 69/00* (2013.01); *A01B 69/008* (2013.01); *A01B 71/02* (2013.01); *A01B 76/00* (2013.01); *A01B 79/02* (2013.01); *A01C 21/005* (2013.01); *A01G 25/09* (2013.01)

(56) References Cited

U.S. PATENT DOCUMENTS

| | | | |
|---|---|---|---|
| 4,227,211 A | 10/1980 | Disbrow | |
| 4,683,969 A | 8/1987 | Littau | |
| 4,696,349 A | 9/1987 | Harwood et al. | |
| 4,704,851 A | 11/1987 | Manor | |
| 4,735,365 A | 4/1988 | Smeller et al. | |
| 5,348,226 A | 9/1994 | Heiniger et al. | |
| 6,041,582 A | 3/2000 | Tiede et al. | |
| 7,073,314 B2 | 7/2006 | Beck et al. | |
| 7,650,737 B1 | 1/2010 | Lovett et al. | |
| 9,030,549 B2 | 5/2015 | Redden | |
| 9,064,173 B2 | 6/2015 | Redden | |
| 9,538,696 B2 * | 1/2017 | Katupitiya | A01B 69/008 |
| 10,149,422 B2 | 12/2018 | Tippery et al. | |
| 2002/0158765 A1 * | 10/2002 | Pape | G06Q 10/10 |
| | | | 340/572.1 |
| 2004/0061606 A1 * | 4/2004 | Gronvold | A61B 5/0002 |
| | | | 340/539.11 |
| 2005/0135912 A1 | 6/2005 | Schempf et al. | |
| 2006/0054092 A1 * | 3/2006 | Valencia | G16H 20/60 |
| | | | 119/51.02 |
| 2006/0062662 A1 | 3/2006 | Curl et al. | |
| 2006/0201432 A1 * | 9/2006 | Pratt | G06Q 10/10 |
| | | | 119/51.02 |
| 2006/0243465 A1 | 11/2006 | Kallevig | |
| 2007/0088194 A1 * | 4/2007 | Tahar | A61B 5/0031 |
| | | | 600/102 |
| 2007/0188605 A1 | 8/2007 | Anderson et al. | |
| 2007/0288249 A1 * | 12/2007 | Rowe | A01K 11/008 |
| | | | 705/7.11 |
| 2008/0046130 A1 * | 2/2008 | Faivre | A01G 25/092 |
| | | | 239/728 |
| 2008/0206026 A1 | 8/2008 | Jones | |
| 2008/0279629 A1 | 11/2008 | Nasby | |
| 2009/0277049 A1 | 11/2009 | Black | |
| 2011/0283673 A1 | 11/2011 | Moersch et al. | |
| 2012/0083982 A1 | 4/2012 | Bonefas et al. | |
| 2012/0095652 A1 | 4/2012 | Anderson | |
| 2012/0259537 A1 | 10/2012 | Schmidt et al. | |
| 2013/0076101 A1 | 3/2013 | Simon | |
| 2013/0129142 A1 | 5/2013 | Miranda-Steiner | |
| 2014/0019312 A1 * | 1/2014 | Renz | G06Q 10/10 |
| | | | 705/28 |
| 2014/0121807 A1 * | 5/2014 | Jung | G06Q 10/087 |
| | | | 700/115 |
| 2014/0122156 A1 * | 5/2014 | Jung | G06Q 10/06313 |
| | | | 705/7.23 |
| 2014/0182519 A1 * | 7/2014 | Tupin, Jr. | A61B 5/6831 |
| | | | 119/859 |
| 2014/0259897 A1 | 9/2014 | Godbole et al. | |
| 2015/0015697 A1 | 1/2015 | Redden et al. | |
| 2015/0027044 A1 | 1/2015 | Redden | |
| 2015/0053436 A1 * | 2/2015 | Thompson | A01B 19/06 |
| | | | 172/23 |
| 2015/0237791 A1 * | 8/2015 | Bassett | A01B 73/005 |
| | | | 172/3 |
| 2015/0251309 A1 | 9/2015 | Chao-Ming | |
| 2015/0275466 A1 | 10/2015 | Behr et al. | |
| 2015/0351309 A1 * | 12/2015 | Gaus | A01G 25/09 |
| | | | 239/744 |
| 2015/0351320 A1 | 12/2015 | Takahara et al. | |
| 2015/0354943 A1 | 12/2015 | Posselius et al. | |
| 2016/0042038 A1 * | 2/2016 | Schumacher | A01K 27/009 |
| | | | 707/722 |
| 2016/0119770 A1 | 4/2016 | Ryu et al. | |
| 2016/0147962 A1 | 5/2016 | Vollmar et al. | |
| 2016/0223506 A1 | 8/2016 | Shriver et al. | |
| 2016/0255778 A1 | 9/2016 | Redden et al. | |
| 2017/0016870 A1 | 1/2017 | McPeek | |
| 2017/0030877 A1 | 2/2017 | Miresmailli et al. | |
| 2017/0089138 A1 | 3/2017 | Pollock et al. | |
| 2017/0112043 A1 | 4/2017 | Nair et al. | |
| 2017/0145657 A1 | 5/2017 | Erhardt et al. | |
| 2017/0156288 A1 * | 6/2017 | Singh | A01K 11/002 |
| 2017/0251589 A1 | 9/2017 | Tippery et al. | |
| 2017/0325399 A1 * | 11/2017 | Heinrich | A01C 15/00 |
| 2018/0124992 A1 | 5/2018 | Koch et al. | |
| 2018/0255705 A1 | 9/2018 | Keski-Luopa et al. | |
| 2018/0263180 A1 | 9/2018 | Schlipf et al. | |
| 2019/0053470 A1 * | 2/2019 | Singh | A01K 11/004 |

FOREIGN PATENT DOCUMENTS

| | | |
|---|---|---|
| CN | 102349369 A | 2/2012 |
| CN | 203457514 U | 3/2014 |
| FR | 3016675 A1 | 7/2015 |
| GB | 1052808 A | 12/1966 |
| WO | 2014134218 A1 | 9/2014 |

OTHER PUBLICATIONS

Adrian A. Koller, "Design, Performance Prediction and Validation of a Seed Orienting Corn Planter," Ph.D. Dissertation, Oklahoma State University, May 2013.

Extended Search Report dated Nov. 7, 2019 for EP Application No. 16876939.6.

International Search Report and Written Opinion dated Apr. 21, 2017 for PCT/US2016/067625.

Mittek, Mateusz et al., "Health Monitoring of Group-Housed Pigs using Depth-Enabled Multi-Object Tracking", http://homepages.inf.ed.ac.uk/rbf/VAIB16PAPERS/vaibmittek.pdf, 4 pages.

Office Action Received in EP Application No. 16876939.6 dated Sep. 7, 2021, 3 pages.

(56) References Cited

OTHER PUBLICATIONS

Psota, Eric T. et al., "Multi-Pig Part Detection and Association with a Fully-Convolutional Network", Sensors 2019, 19, 852; doi: 10.3390/s19040852, https://www.mdpi.com/1424-8220/19/4/852/htm, pp. 1-24.
Extended Search Report for European Application No. 1978942.2 dated Oct. 25, 2021, 12 pages.

* cited by examiner

AGRICULTURAL SYSTEM HAVING ACTUATABLE WORK TOOL ASSEMBLIES

CROSS-REFERENCE TO RELATED APPLICATIONS

The present application is related to and claims the benefit of the following applications:

The present application constitutes a continuation-in-part patent application of U.S. Non-Provisional patent application Ser. No. 16/940,341, filed Jul. 27, 2020, which is a continuation application of U.S. Non-Provisional patent application Ser. No. 16/215,008, filed Dec. 10, 2018, which is a continuation application of U.S. Non-Provisional patent application Ser. No. 15/384,132, filed Dec. 19, 2016, which claims priority to the following provisional patent applications: U.S. Provisional Patent Application Ser. No. 62/269,770, filed Dec. 18, 2015; U.S. Provisional Patent Application Ser. No. 62/269,800, filed Dec. 18, 2015; U.S. Provisional Patent Application Ser. No. 62/319,861, filed Apr. 8, 2016; U.S. Provisional Patent Application Ser. No. 62/335,260, filed May 12, 2016; and U.S. Provisional Patent Application Ser. No. 62/368,080, filed Jul. 28, 2016, whereby each of the above-listed applications is incorporated herein by reference in the entirety.

The present application constitutes a continuation-in-part patent application of U.S. Non-Provisional patent application Ser. No. 16/390,736, filed Apr. 22, 2019, which claims priority to U.S. Provisional Patent Application Ser. No. 62/660,844, filed Apr. 20, 2018, and which is a continuation-in-part of U.S. Non-Provisional patent application Ser. No. 15/384,132, filed Dec. 19, 2016, which claims priority to the following provisional patent applications: U.S. Provisional Patent Application Ser. No. 62/269,770, filed Dec. 18, 2015; U.S. Provisional Patent Application Ser. No. 62/269,800, filed Dec. 18, 2015; U.S. Provisional Patent Application Ser. No. 62/319,861, filed Apr. 8, 2016; U.S. Provisional Patent Application Ser. No. 62/335,260, filed May 12, 2016; and U.S. Provisional Patent Application Ser. No. 62/368,080, filed Jul. 28, 2016, whereby each of the above-listed applications is incorporated herein by reference in the entirety.

The present application claims priority to U.S. Provisional Patent Application Ser. No. 62/885,694, filed Aug. 12, 2019, which is incorporated herein by reference in the entirety.

The present application claims priority to U.S. Provisional Patent Application Ser. No. 63/064,659, filed Aug. 12, 2020, which is incorporated herein by reference in the entirety.

TECHNICAL FIELD

The present invention generally relates to an agricultural system, and, in particular, to an agricultural system capable of carrying out various measurements of one or more objects or one or more regions of an environment via one or more actuatable work tool assemblies.

BACKGROUND

Traditionally, performing measurements and/or crop-scouting (e.g., searching for and identifying crops and/or undesirable vegetation such as weeds) within an agricultural environment is a long and tedious process requiring vast amounts of manual effort. Often, farmers and crop consultants must spend several hours searching a field looking for weeds, fungus, indications of nutrient deficiency (e.g., lack of fertilizer, improper fertilization, soil wash outs, flooding, or the like), or the like. Even more difficult is the process of crop scouting in an environment (e.g., a field) containing a large amount of mature vegetation that may impede human mobility. In other settings (e.g., livestock facilities), performing measurements is frequently dangerous in that the consultant may be exposed to large, potentially hostile animals.

Accordingly, it would be desirable to provide a system that cures the shortcomings of the previous approaches as identified above.

SUMMARY

An agricultural system is disclosed. In one embodiment, the agricultural system includes a support assembly including one or more support structures. In another embodiment, the agricultural system includes one or more propulsion units coupled to the one or more support structures. In another embodiment, the agricultural system includes one or more actuatable work tool assemblies, wherein the one or more actuatable work tool assemblies include one or more measurement attachments configured to perform one or more measurements of at least one of one or more objects or one or more regions within an environment. In another embodiment, the agricultural system includes one or more actuation systems, wherein the one or more actuation systems are configured to provide actuation of the one or more actuatable work tool assemblies. In another embodiment, the agricultural system includes a controller, wherein the controller includes one or more processors configured to execute a set of program instructions stored in memory, wherein the program instructions are configured to cause the one or more processors to at least: direct the one or more actuation systems to actuate the one or more actuatable work tool assemblies to a selected position; and direct the one or more actuatable work tool assemblies to perform one or more measurements of at least one of one or more objects or one or more regions within the environment.

An irrigation system is disclosed. In one embodiment, the agricultural system includes a support assembly including one or more support structures. In another embodiment, the agricultural system includes one or more propulsion units coupled to the one or more support structures. In another embodiment, the agricultural system includes one or more actuatable work tool assemblies, wherein the one or more actuatable work tool assemblies include one or more measurement attachments configured to perform one or more measurements of at least one of one or more objects or one or more regions within an environment. In another embodiment, the agricultural system includes one or more actuation systems, wherein the one or more actuation systems are configured to provide actuation of the one or more actuatable work tool assemblies. In another embodiment, the agricultural system includes a controller, wherein the controller includes one or more processors configured to execute a set of program instructions stored in memory, wherein the program instructions are configured to cause the one or more processors to at least: direct the one or more actuation systems to actuate the one or more actuatable work tool assemblies to a selected position; and direct the one or more actuatable work tool assemblies to perform one or more measurements of at least one of one or more objects or one or more regions within the environment.

A livestock management system is disclosed. In one embodiment, the agricultural system includes a support assembly including one or more support structures. In another embodiment, the agricultural system includes one or more propulsion units coupled to the one or more support structures. In another embodiment, the agricultural system includes one or more actuatable work tool assemblies, wherein the one or more actuatable work tool assemblies include one or more measurement attachments configured to perform one or more measurements of at least one of one or more objects or one or more regions within a livestock facility. In another embodiment, the agricultural system includes one or more actuation systems, wherein the one or more actuation systems are configured to provide actuation of the one or more actuatable work tool assemblies. In another embodiment, the agricultural system includes a controller, wherein the controller includes one or more processors configured to execute a set of program instructions stored in memory, wherein the program instructions are configured to cause the one or more processors to at least: direct the one or more actuation systems to actuate the one or more actuatable work tool assemblies to a selected position; and direct the one or more actuatable work tool assemblies to perform one or more measurements of at least one of one or more objects or one or more regions within the livestock facility.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Referring generally to FIG. 1A through FIG. 4B, an agricultural system and a related method are described in accordance with one or more embodiments of the present disclosure. For the purposes of the present disclosure, the term "agricultural system" may be used interchangeably with the terms "irrigation system" and "livestock management system". As previously described, the present application claims priority to and incorporates by reference U.S. Non-Provisional patent application Ser. No. 16/940,341, filed Jul. 27, 2020 (and the cases related thereto and previously described herein), and U.S. Non-Provisional patent application Ser. No. 16/390,736, filed Apr. 22, 2019 (and the cases related thereto and previously described herein), each of which discloses one or more embodiments of agricultural, farming, and/or livestock management systems. It is noted that the embodiments of the present disclosure may incorporate any portion of any one or more of such embodiments, and that the terms "agricultural system," "irrigation system," and/or "livestock management system" may refer to any system incorporating any portion of any embodiment or the present disclosure or any embodiment of the aforementioned applications.

Embodiments of the present disclosure are directed to an agricultural system capable of performing one or more measurements in an environment (e.g., crop field, livestock facility housing swine, poultry, or cattle, etc.). Embodiments of the present disclosure are also directed to an agricultural system comprising a center-pivot or lateral irrigation system. Embodiments of the present disclosure are also directed to a support assembly of the agricultural system.

Figure 1A:
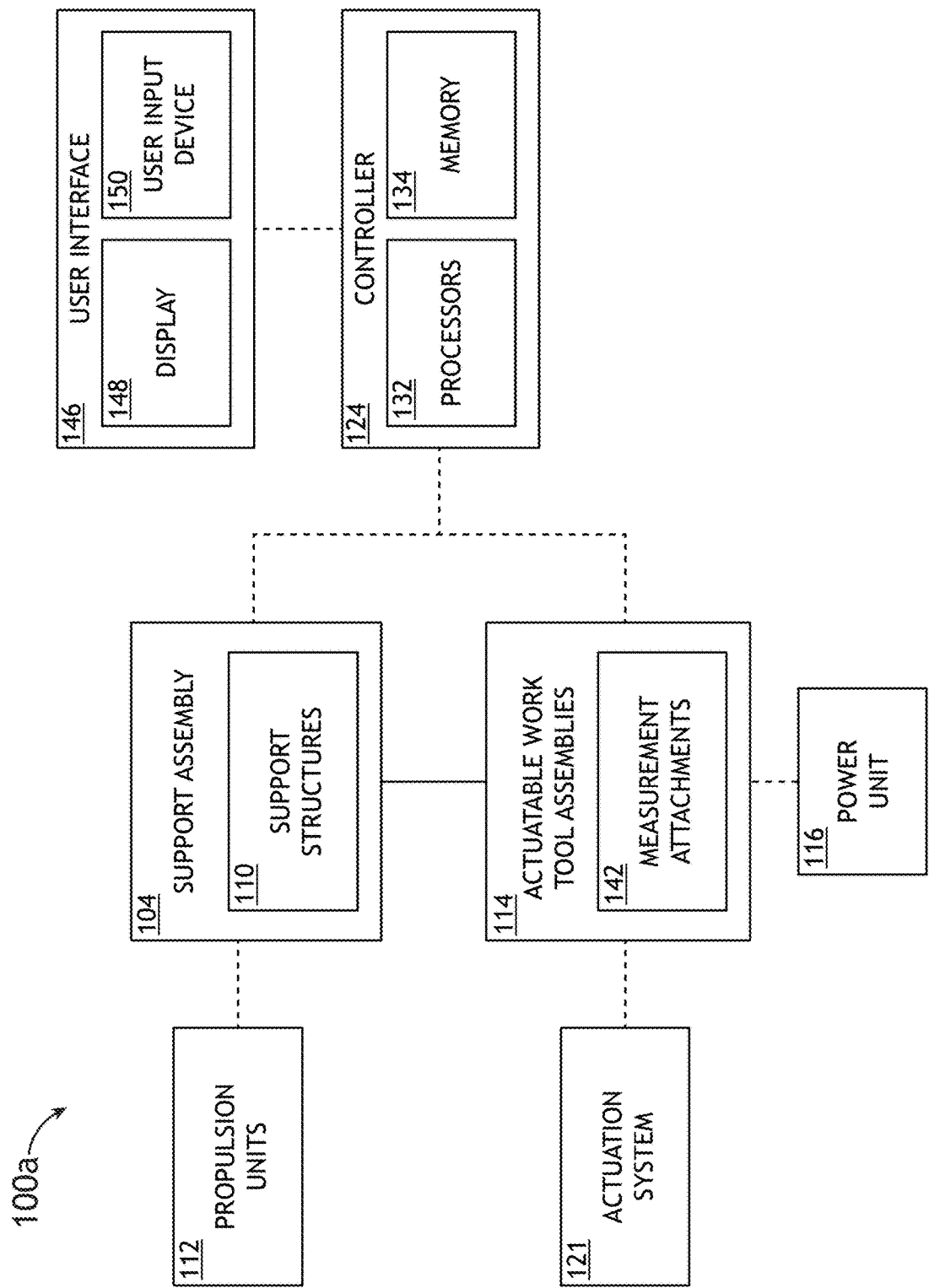
FIG. 1A illustrates a block diagram of an agricultural system, in accordance with one or more embodiments of the present disclosure.
Figure 1B:
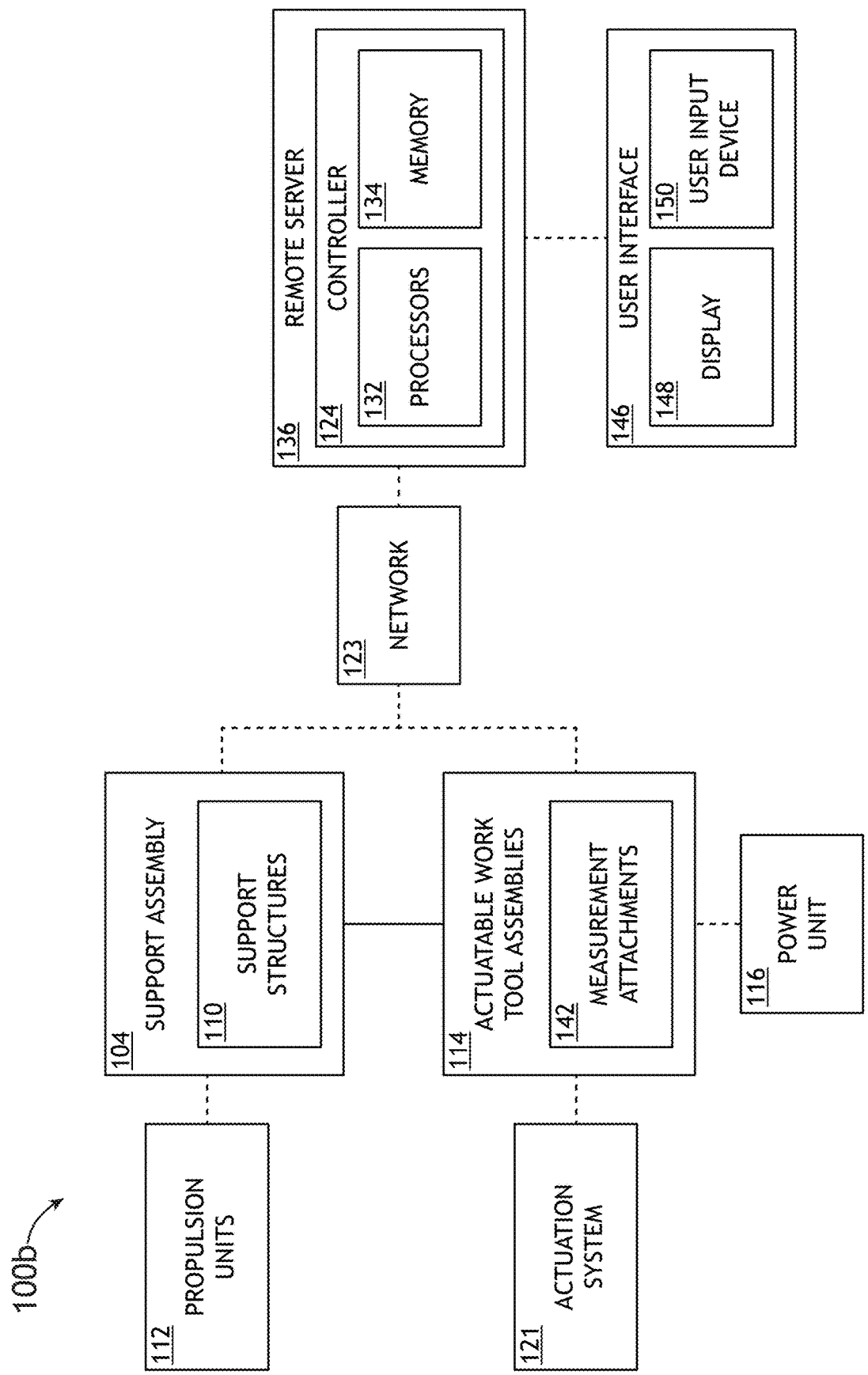
FIG. 1B illustrates a block diagram of an agricultural system, in accordance with one or more embodiments of the present disclosure.

FIGS. 1A through 1B illustrate block diagram views of an agricultural system 100, in accordance with one or more embodiments of the present disclosure.

In one embodiment, the agricultural system 100 includes one or more support assemblies 104. For the purposes of the present disclosure, the one or more support assemblies 104 are generally described in the context of a single support assembly 104 for reasons of clarity. It is noted, however, that such a configuration is not a limitation on the scope of the present disclosure as it is noted that the agricultural system 100 may include any number of support assemblies 104 (e.g., one, two, three, etc.). In another embodiment, a support assembly 104 includes one or more support frames 106 and one or more support structures 110.

In another embodiment, the agricultural system 100 includes one or more propulsion units 112. For example, the one or more propulsion units 112 may be configured to provide movement to one or more portions of the one or more support assemblies 104.

In another embodiment, the agricultural system 100 includes one or more actuatable work tool assemblies 114.

For example, as discussed further herein, the one or more actuatable work tool assemblies 114 may be coupled to one more portions of the support assembly 104. By way of another example, the one or more actuatable work tool assemblies 114 may include one or more measurement attachments 142 configured to perform one or more measurements of one or more objects or one or more regions within an environment in which the agricultural system 100 is located (e.g., a field, an orchard, a vineyard, a greenhouse, a livestock facility, a barn, a feedlot, a feedlot bunk, a livestock pen, or the like). In another embodiment, the one or more actuatable work tool assemblies 114 include one or more power units 116.

The one or more measurement attachments 142 may include, but are not limited to camera attachments (e.g., thermal camera, photographic camera, infrared camera, activity tracking camera), audio recording attachments, thermal imaging attachments, 3D scanning/imaging device attachments, laser scanning device attachments, NDVI scanning device attachments, gas sensor attachments (e.g., methane, ammonia, hydrogen dioxide, hydrogen monoxide, hydrogen sulfide sensors), wind speed sensor attachments, humidity sensor attachments, evapotranspiration sensor attachments, light sensor attachments, soil moisture sensor attachments, feed level sensor attachments, liquid level sensor attachments, temperature probe attachments, one or more anemometers, one or more depth sensors, one or more crop vigor sensors, on or more terrain quality sensors, one or more gully detection sensors, or the like.

The one or more measurement attachments 142 may be configured to capture one or more images of one or more crops (e.g. plants, weeds, vegetation, vines, trees) within the environment such that the controller 124 may perform a phenotyping analysis based on the one or more images of the one or more crops. In this regard, the one or more measurement attachments 142 may include one or more agronomy imaging attachments. For example, the one or more measurement attachments 142 may include, but are not limited to, visible light, hyperspectral, thermal, color-sensing, or distance-sensing vision systems. In another embodiment, the one or more measurement attachments 142 are configured to observe a set range of vision. For instance, the one or more measurement attachments 142 may be configured to observe a spherical 360-degree range. Alternatively, the one or more measurement attachments 142 may be configured to observe a hemispherical, 180-degree range. Phenotyping measurement and selection is described generally in U.S. Patent Publication No. 2015/0015697, published on Jan. 15, 2015, which is incorporated herein by reference in the entirety.

In another embodiment, the one or more measurement attachments 142 are configured to automatically capture one or more images of one or more crops. For example, the images may be used independently. By way of another example, the images be stitched together to form a multi-dimensional view of a field. In this regard, an otherwise unreviewable field due to the nature of the field and/or the surrounding environment may allow for a remote walk-through of the field by a user. In another embodiment, the captured one or more images of the one or more crops include one or more crop features. For example, the one or one crop features captured in the one or more images may include, but are not limited to, crop color for the purpose of proactively applying nutrients; pest locations for the purpose of identifying the pest and proactively applying insecticides; fungus locations for the purpose of identifying the fungus and proactively applying fungicides; and weeds for the purpose of identifying the weed and proactively guiding a mechanical weeding and/or herbicide-spraying attachment. By way of another example, the captured one or more images of the one or more crops include one or more images of harvest product through the unharvested crop canopy for the purpose of predicting crop yield on a nearly real-time basis. It is noted the captured one or more images may be processed in conjunction with specific GPS information to generate variable rate maps for one or more of fertilizer, herbicide, fungicide, insecticide, and irrigation application.

It is noted herein the measurement attachments 142 may be configured for actuation to a position underneath a crop canopy for the purpose of obtaining images of and/or data regarding one or more crops and/or emerging problems with the one or more crops (e.g. weeds, insect infestations, fungus that can damage crops). Additionally, it is noted herein the measurement attachments 142 may be used to remotely monitor crop maturity (e.g. comparing size, shape, seeds, root structure, color, etc. to those ideal characteristics that could be exhibited in ideal laboratory conditions).

In another embodiment, the one or more measurement attachments 142 may include phenotyping devices configured to gather agronomic data including, but not limited to, NDVI readings (Normalized Difference Vegetation Index), VNIR readings (Visible and Near Infrared), IR readings (Infrared), VIS readings (Visible Intensity Spectrum), PSII readings (Photosystem II, or water-plastoquinone oxidoreductase), laser and/or radar height scanning readings for determining the height of a plant, crop, or measuring the position of ground relative to the work tool and/or platform, $CO_2$ readings, thermal readings, hyperspectral readings. It is noted NDVI is a graphical indicator that can be used to analyze remote sensing measurements for the purpose of determining if the target contains live green vegetation). It is further noted Photosystem II (or water-plastoquinone oxidoreductase) is the first protein complex in the light-dependent reactions of oxygenic photosynthesis, which is located in the thylakoid membrane of plants, algae, and cyanobacteria). It is further noted hyperspectral readings are often used to obtain the spectrum for each pixel in an image, for the purpose of finding objects, identifying materials, or detecting processes.

In another embodiment, the agricultural system 100 includes one or more actuation systems 121. For example, the agricultural system 100 may include one or more actuation systems 121 configured to provide actuation to the one or more actuatable work tool assemblies 114 along one or more portions of the agricultural system 100. The one or more actuation systems 121 may be configured to actuate the one or more actuatable work tool assemblies 114 via one or more portions of the support assembly 104. For example, the one or more actuation systems 121 may be configured to actuate the one or more actuatable work tool assemblies 114 by actuating one or more portions of the support assembly 104 coupled to the one or more actuatable work tool assemblies 114. The one or more actuation systems 121 may be disposed within the one or more actuatable work tool assemblies 114.

In another embodiment, the agricultural system 100 includes one or more controllers 124. The one or more controllers 124 are configured to control any of the various functions of the portions of the agricultural system 100. For example, the one or more controllers 124 may be programmed to control one or more functions of the one or more actuatable work tool assemblies 114. For instance, the one or more controllers 124 may be programmed to transmit one or more sets of information to control one or more functions of any of the one or more measurement attachments 142. By way of another example, the one or more controllers 124 may be configured to perform one or more processing functions of the agricultural system 100. The one or more controllers 124 may include one or more processors 132 and memory 134. The one or more processors 132 may be configured to execute program instructions stored in memory 134 configured for causing the one or more processors 132 to execute one or more of the various steps described throughout the present disclosure.

In another embodiment, the one or more controllers 124 may be communicatively coupled to a user interface 146. For example, the user interface 146 may include a display 148 and/or a user input device 150.

In another embodiment, the display 148 includes any display device known in the art. For example, the display device may include, but is not limited to, a liquid crystal display (LCD). By way of another example, the display device may include, but is not limited to, an organic light-emitting diode (OLED) based display. By way of another example, the display device may include, but is not limited to a CRT display. Those skilled in the art should recognize that a variety of display devices may be suitable for implementation in the present disclosure and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present disclosure.

In one embodiment, the user input device 150 includes any user input device known in the art. For example, user input device 150 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device or the like. In the case of a touchscreen interface, those skilled in the art should recognize that a large number of touchscreen interfaces may be suitable for implementation in the present disclosure. For instance, the display device 148 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present disclosure. In another embodiment, the user input device 150 may include, but is not limited to, a bezel mounted interface.

The one or more processors 132 of the controller 124 may include any one or more processing elements known in the art. In general, the term "processor" may be broadly defined to encompass any device having one or more processing elements, which execute program instructions from a non-transitory memory medium. In one embodiment, the one or more processors 132 may include any microprocessor-type computational device configured to execute software algorithms and/or instructions. The one or more processors 132 may be embodied in, or consist of, a personal computer system, a mobile device (e.g., tablet, smart phone, laptop, etc.), mainframe computer system, workstation, image computer, parallel processor, a networked computer, or any other computational device known in the art. In general, the term "computational device" may be broadly defined to encompass any device having data processing or logic capabilities. It should be recognized that the steps described throughout the present disclosure may be carried out by a single controller or, alternatively, multiple controllers.

The memory 134 may include any storage medium known in the art suitable for storing program instructions executable by the associated one or more processors and/or for storing one or more sets of measurement data, one or more sets of information, and/or one or more databases acquired from the various components and sub-systems of system 100. For example, the memory may include, but is not limited to, random access memory (RAM), read-only memory (ROM), or a persistent store, such as a mass storage device, hard drives, CDROM, DVDROM, tape, erasable programmable read-only memory (EPROM or flash memory), any magnetic, electromagnetic, solid state, infrared, optical, or electrical system, apparatus or device for storing information, or any other type of media suitable for storing electronic data. By way of another example, the one or more sets of information may include, but are not limited to, one or more operational conditions of a component (e.g. on, standby, completing assigned task, off, and the like), one or more operational parameters for the one or more operational conditions of the component (e.g. amount of power consumption, amount of power generation, rotational speed of a motor, rotational capability of a motor, volume of stored material, position coordinates of a component location of the agricultural system 100, or position coordinates of a component location relative to other components on the agricultural system 100.

In one embodiment, as illustrated in FIG. 1A, the controller 124 of an agricultural system 100a may comprise one or more local controllers. For example, the controller 124 may be disposed on or within a component of the agricultural system 100a, including, without limitation, the support assembly 104 or the actuatable work tool assemblies 114. The controller 124 may be communicatively coupled to any component of the agricultural system 100a via one or more wireline connections (e.g., direct fiber optic cable, direct copper wire, DSL-based interconnection, Cable-based interconnection, T9-based interconnection, and the like etc.). By way of another example, the controller 124 may be communicatively coupled to any component of the agricultural system 100a via one or more wireless connections (e.g., GSM, GPRS, CDMA, EV-DO, EDGE, WiMAX, LTE, WiFi, RF, LoRa, Bluetooth, a customized wireless protocol and the like).

In one embodiment, as illustrated in FIG. 1B, the controller 124 of an agricultural system 100b may comprise one or more controllers located in a remote server 136. For example, one or more components of the agricultural system 100b (e.g., the support assembly 104 and/or the actuatable work tool assemblies 114) may each include network interface circuitry (not shown) for connecting to a network 123. The remote server 136 may include network interface circuitry (not shown) for connecting to the network 123. The network interface circuitry of the one or more components of the agricultural system 100b and the network interface circuitry of the remote server 136 may include any network interface circuitry known in the art. For example, the network interface circuitry may include wireline-based interface devices (e.g., DSL-based interconnection, Cable-based interconnection, T9-based interconnection, and the like). In another instance, the network interface circuitry may include a wireless-based interface device employing GSM, GPRS, CDMA, EV-DO, EDGE, WiMAX, LTE, WiFi protocols, RF, LoRa, and the like. The remote server 136 may be located in any location remote to any other component of the agricultural system 100, including, without limitation, in a barn.

In another embodiment, the remote server 136 may function as a cloud-based architecture for one or more of storage, analysis, and computation of data received from and transmitted to one or more components of the agricultural system 100b, including, without limitation, measurement data received from the one or more measurement attachments 142 of the one or more actuatable work tool assemblies 114. By way of another example, the remote server 136 may function as a cloud-based architecture for one or more of storage, analysis, and computation of phenotyping measurement data (e.g., images of one or more crops) received from the one or more measurement attachments 142 of the one or more actuatable work tool assemblies 114.

In another embodiment, the one or more power units 116 may comprise any power unit known in the art to be suitable for the purposes contemplated by the present disclosure. For example, the one or more power units 116 may comprise a rechargeable battery configured to be re-charged at one or more docking stations coupled to the agricultural system 100 (not shown). In this regard, the controller 124 may be configured to provide one or more control signals to the one or more actuatable work tool assemblies 114, wherein the one or more control signals direct the one or more actuatable work tool assemblies 114 to dock with the one or more docking stations. In this regard, the one or more actuatable work tool assemblies 114 may be reversibly electrically couplable to the one or more docking stations.

The controller 124 may be configured to provide one or more control signals to one or more systems based on the one or more measurements of the actuatable work tool assemblies 114. For example, the controller 124 may be configured to provide one or more control signals to one or more irrigation systems (e.g., a center-pivot irrigation system, a lateral irrigation system, a drip irrigation system). By way of another example, the controller 124 may be configured to provide one or more control signals to one or more other systems, including, without limitation, a fertilizer application system, a herbicide application system, an insecticide application system, a weed identification system, a curtain system, a ventilation system, an automatic livestock sorting system, an automatic feeding system, an automatic weighing system, or an automated system configured to provide medicine to one or more animals (e.g., an automated syringe configured to administer vaccines to one or more animals in a confined area such as a scale).

The one or more docking stations may be communicatively coupled to the controller 124. For example, the one or more docking stations may be coupled to the controller 124 via one or more wireline connections (e.g., direct fiber optic cable, direct copper wire, DSL-based interconnection, Cable-based interconnection, T9-based interconnection, and the like etc.). By way of another example, the one or more docking stations may be communicatively coupled to the controller 124 via one or more wireless connections (e.g., GSM, GPRS, CDMA, EV-DO, EDGE, WiMAX, LTE, WiFi, RF, LoRa, Bluetooth, a customized wireless protocol and the like).

The one or more docking stations may be configured to receive and store data from one or more components of the agricultural system 100, including, without limitation, measurement data received from the one or more measurement attachments 142 of the one or more actuatable work tool assemblies 114. The one or more docking stations may be further configured to transmit data received from one or more components of the agricultural system 100 to the controller 124. In this regard, the one or more docking stations may act as data repeaters. The one or more docking stations may include any network interface circuitry known in the art. For example, the network interface circuitry may include wireline-based interface devices (e.g., DSL-based interconnection, Cable-based interconnection, T9-based interconnection, and the like). In this regard, the one or more docking stations may be configured to transmit data received from one or more components of the agricultural system 100 to the remote server 136 via the network 123. By way of another example, the one or more actuatable work tool assemblies 114 may be configured to store measurement data in memory disposed within the one or more actuatable work tool assemblies 114 until the one or more actuatable work tool assemblies 114 couples with the one or more docking stations, at which time the one or more docking stations may receive the measurement data from the one or more actuatable work tool assemblies.

Figure 2A:
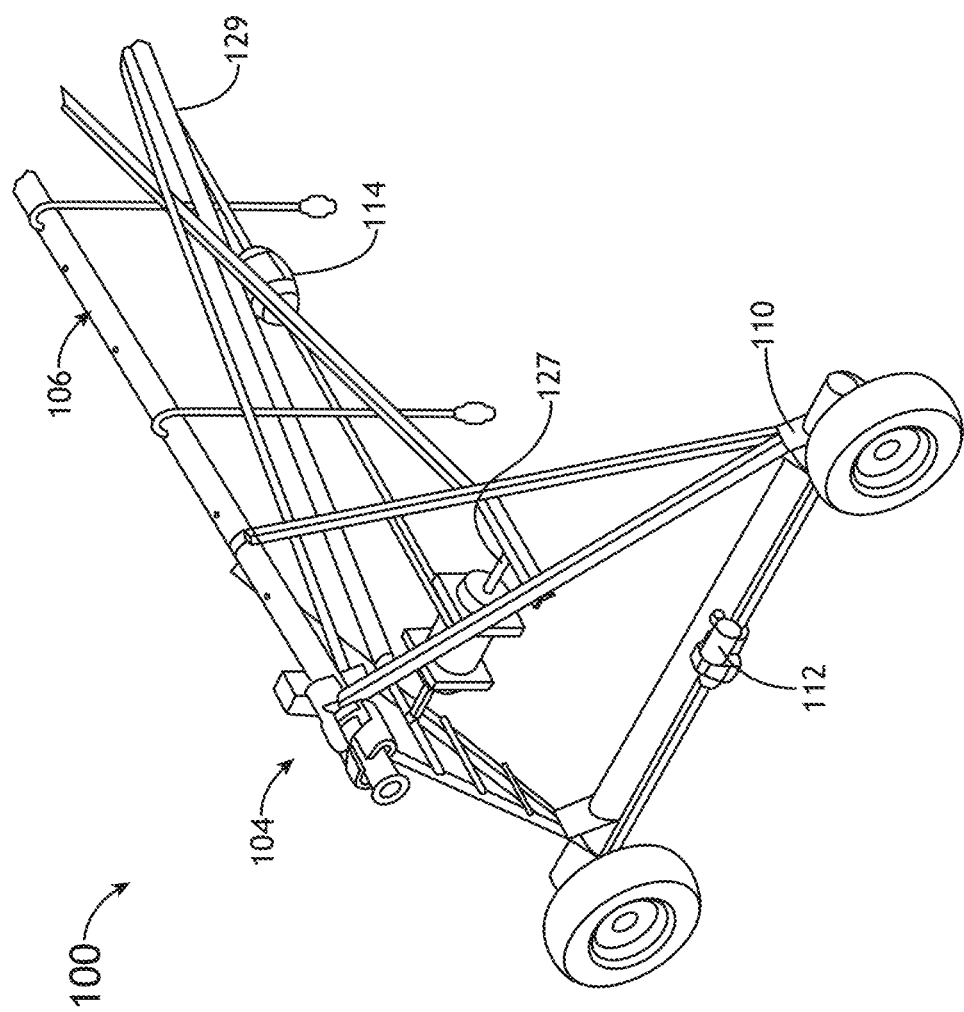
FIG. 2A illustrates an agricultural system, in accordance with one or more embodiments of the present disclosure.
Figure 2B:
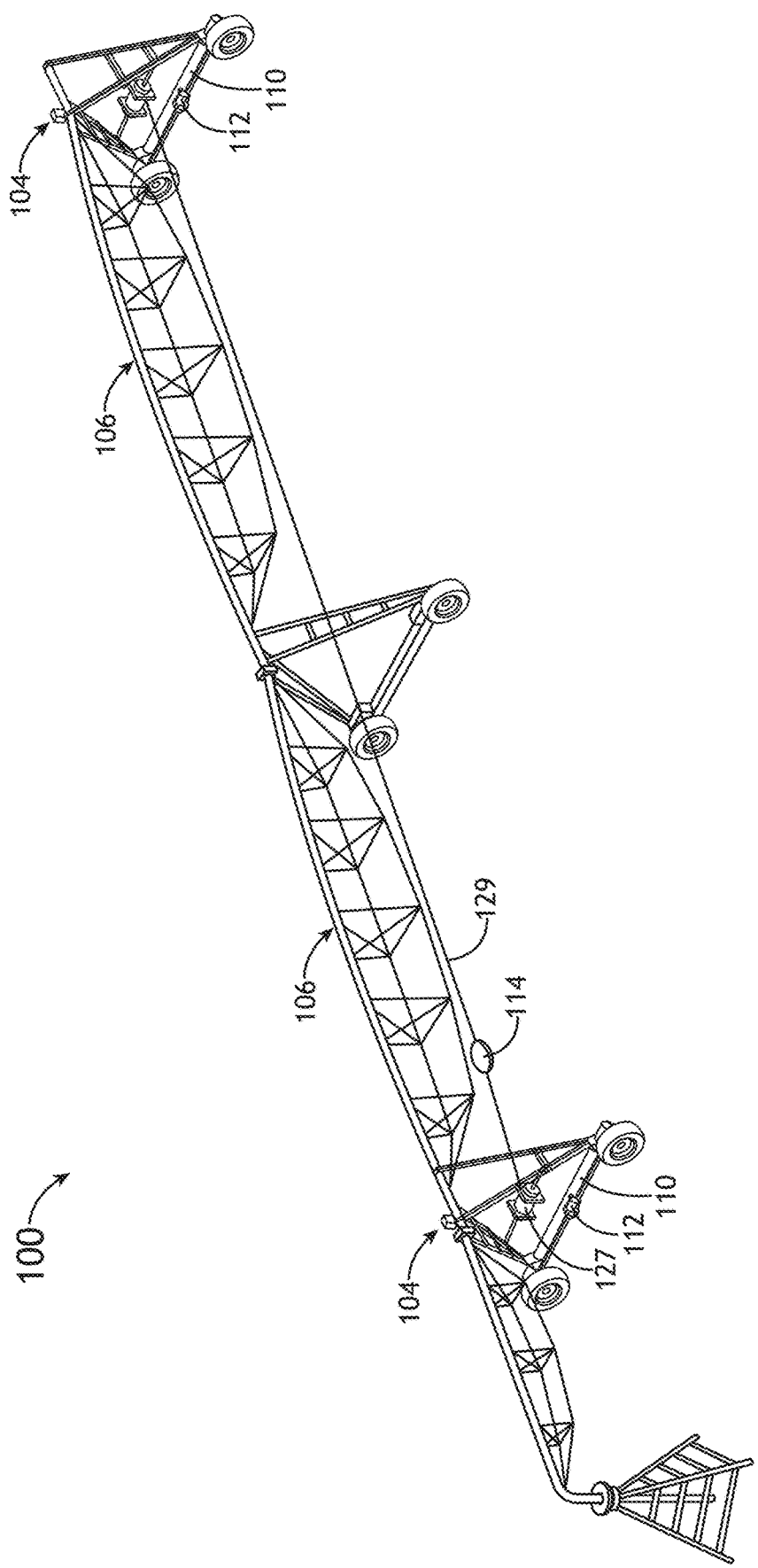
FIG. 2B illustrates an agricultural system, in accordance with one or more embodiments of the present disclosure.

FIGS. 2A and 2B illustrate an agricultural system 100, in accordance with one or more embodiments of the present disclosure. The agricultural system 100 may include the support assembly 104, which, in some embodiments, may include a support frame 106. The propulsion units 112 may be configured to move one or more portions of the agricultural system 100 along any direction and are coupled to the agricultural system 100 via the support structures 110. The agricultural system 100 may comprise any irrigation system known in the art to be suitable for the purposes contemplated by the present disclosure, including, without limitation, a center-pivot irrigation system or a lateral irrigation system.

The one or more actuatable work tool assemblies 114 may be coupled to the support assembly 104. For example, the one or more actuatable work tool assemblies 114 may be coupled to the support assembly 104 via at least one of a gantry assembly or a controlled cable assembly. The gantry assembly may include one or more work tool rails 108 coupled to one or more gantry support structures. The gantry assembly may comprise a powered gantry (e.g., a gantry in which one or more sources of electric power are disposed along one or more portions of the gantry assembly and are configured to provide electric power to the one or more actuatable work tool assemblies 114), or an unpowered gantry (e.g., wherein the one or more actuatable work tool assemblies are configured to receive electric power from a source other than one or more sources of electric power disposed along one of more portions of the gantry assembly). In this regard, the gantry assembly may include an electrical distribution system configured to provide electric power to the one or more actuatable work tool assemblies.

The one or more work tool rails 108 may be coupled to the support assembly 104, and may comprise a plurality of work tool rails 108. For example, the support assembly 104 may include a first work tool rail second work tool rail. In another embodiment, the support assembly 104 includes one or more transfer rails coupling the first work tool and the second work tool rail. Furthermore, the support assembly 104 may include one or more transfer rails configured to couple a first work tool rail of a first gantry assembly and a second work tool rail of a second gantry assembly, such that one or more actuatable work tool assemblies 114 may be actuated between the first gantry assembly and the second gantry assembly. It is noted herein the support assembly 104 may include any number of work tool rails 108. It is further noted herein the support assembly 104 may include any number of transfer rails. In this regard, the agricultural system 100 may be configured to actuate the one or more actuatable work tool assemblies 100 around one or more obstructions within the environment (e.g., feed tubes, water lines, crops, animals, debris, buildings, or other structures).

In another embodiment, as shown in FIGS. 2A and 2B, the one or more actuatable work tool assemblies 114 may be coupled to the support assembly 104 via a controlled cable assembly. The controlled cable assembly may include one or more cables 129 couplable to the one or more actuatable work tool assemblies 114. For example, the one or more cables 129 may include one or more galvanized or stainless-steel cables. By way of another example, the one or more cables 129 may be coupled to the support assembly 104 via any coupling method known in the art to be suitable for the purposes contemplated by the present disclosure, including, without limitation, a threaded coupling or a clevis coupling. By way of another example, the one or more cables 129 may be configured to be coupled to a plurality of support assemblies 104 via one or more fixed "t-shaped" connectors. The one or more cables 129 may include a communications cable configured to permit communication between one or more portions of the one or more actuatable work tool assemblies 114 and any other components of the agricultural system 100.

The controlled cable assembly may include a cable actuation assembly 127. For example, the cable actuation assembly 127 may include any actuation device known in the art to be suitable for actuation of the one or more cables 129. By way of another example, the cable actuation assembly 127 may include a sprocket, a winch, one or more pulleys, and/or an actuation motor. The cable actuation assembly 127 may be coupled to the support assembly 104. The cable actuation assembly 127 may include a plurality of actuation devices. The controller 124 may be configured to provide one or more control signals to the cable actuation assembly. For example, the controller 124 may be configured to coordinate one or more actuations by the plurality of actuation devices of the cable actuation assembly 127. In this regard, the controller 124 may be configured to determine a precise location of the one or more actuatable work tool assemblies 114 at the time at which the one or more actuatable work tool assemblies 114 capture an image.

The cable actuation assembly 127 may be configured to actuate the one or more actuatable work tool assemblies 114 in a multidirectional manner. For example, the cable actuation assembly 127 may be configured to actuate the one or more actuatable work tool assemblies 114 along multiple axes of the agricultural system 100.

Figure 2C:
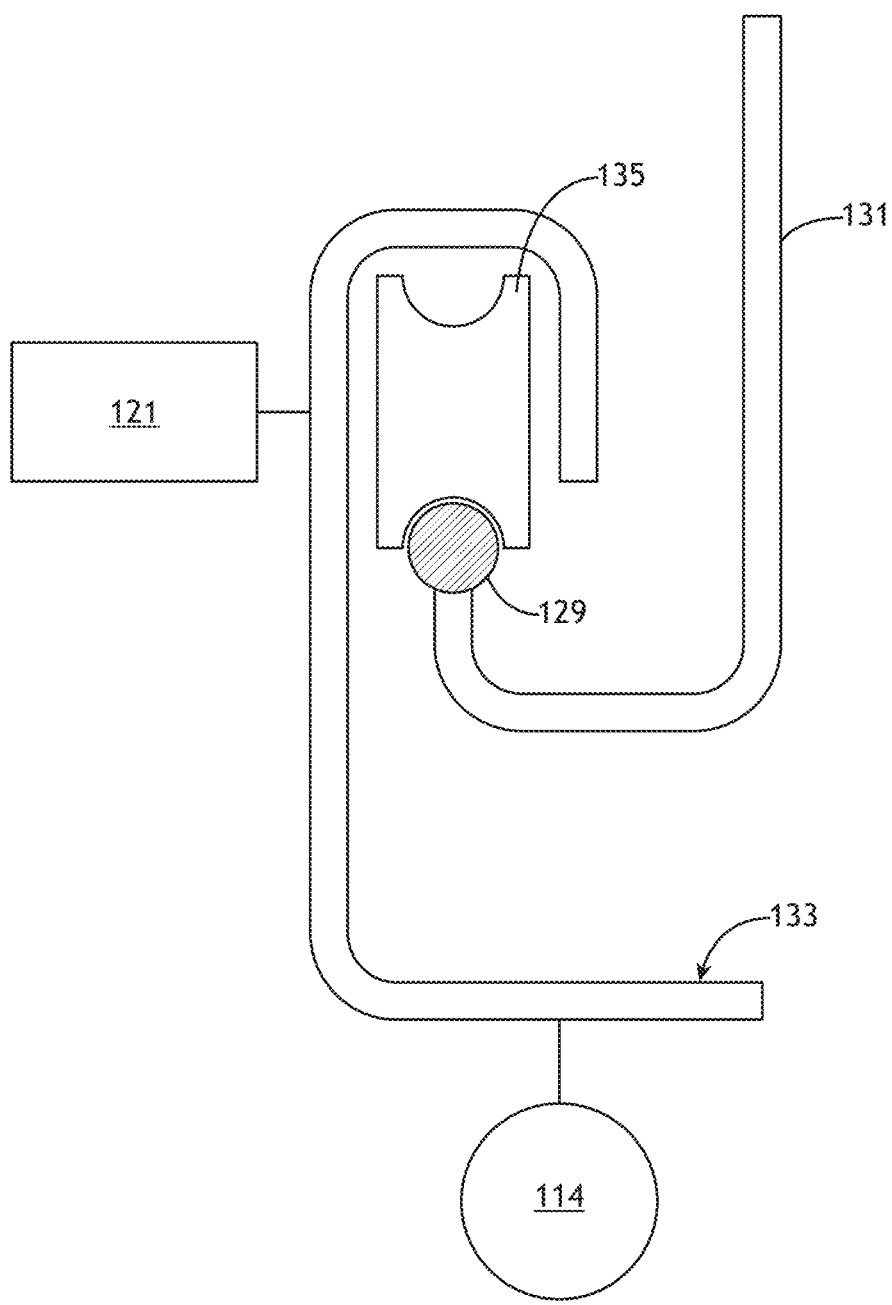
FIG. 2C illustrates cable assembly support structure, in accordance with one or more embodiments of the present disclosure.

The controlled cable assembly may include a plurality of cable assembly support structures 131 coupled to one or more portions of the support assembly 104. For example, as shown in FIG. 2C, the controlled cable assembly may include a cable assembly support structure 131 configured to provide support to the one or more cables 129 of the controlled cable assembly. The cable assembly support structure 131 may be coupled to one or more portions of the support assembly 104, and may be disposed periodically along a length of the agricultural system 100. For example, the cable assembly support structure 131 may be spaced along the length of the agricultural system 100 such that the one or more cables 129 are supported along the length and are not prone to sagging. The cable assembly support structure 131 may be coupled to the one or more cables 129, and may be coupled to one or more cable support assembly roller devices 135. For example, the one or more cable support assembly roller devices 135 may be configured to allow a translation of at least one of the one or more cables 129 or the one or more actuatable work tool assemblies 114 along the length of the agricultural system 100. In this regard, the cable assembly support structures 131 and the one or more cable assembly roller devices 135 may be configured to allow the actuation of the one or more actuatable work tool assemblies 114.

The cable assembly support structure 131 may include an actuatable work tool assembly carrier 133 coupled to the one or more actuatable work tool assemblies 114. For example, the actuatable work tool assembly carrier 133 may be configured to carry the one or more actuatable work tool assemblies 114. The actuatable work tool assembly carrier may be coupled to the one or more cable support assembly roller devices 135. The one or more actuation systems 121 may be coupled to the actuatable work tool assembly carrier 133, and may be configured to provide actuation to the one or more actuatable work tool assemblies 114.

The actuatable work tool assembly carrier 133 may be configured to be removably couplable to the one or more actuatable work tool assemblies 114. For example, the one or more actuatable work tool assemblies 114 may be configured to be removably coupled to the actuatable work tool assembly carrier 133 in order to permit the one or more actuatable work tool assemblies 114 to be cleaned, repaired, maintained, or the like.

Figure 3A:
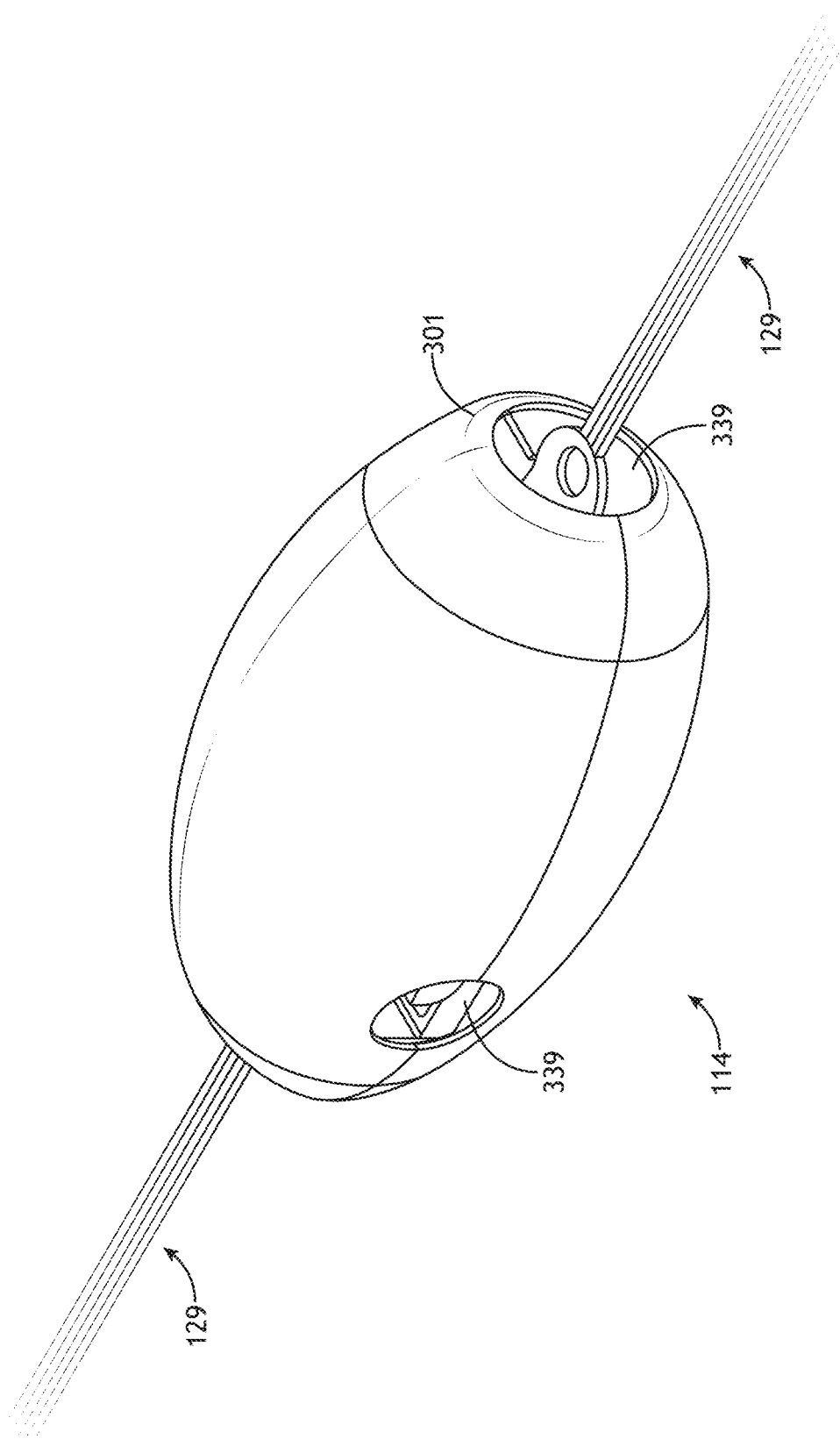
FIG. 3A illustrates an actuatable work tool assembly, in accordance with one or more embodiments of the present disclosure.

FIG. 3A illustrates an actuatable work tool assembly 114, in accordance with one or more embodiments of the present disclosure. The actuatable work tool assembly 114 may be housed within an enclosure configured to protect the actuatable work tool assembly 114 from one or more environmental hazards (e.g., moisture, dust, wind, or the like). The actuatable work tool assembly 114 and/or the enclosure of the actuatable work tool assembly 114 may include one or more canopy-penetrating structures 301 configured to separate a canopy or body of vegetation (e.g., a body of leaves, branches, or the like) and to permit an unimpeded actuation of the actuatable work tool assembly 114 through the canopy of body of vegetation. In this regard, the one or more canopy-penetrating structures 301 may include any shape suitable for separating a canopy or body of vegetation, including, without limitation, a wedge shape, an ellipsoidal shape, a spheroidal shape, and/or a cone shape. By way of another example, the one or more canopy-penetrating structures 301 may include any shape suitable for preventing and/or reducing an aggregation of vegetative matter (e.g., leaves, branches, or other crop debris) on the one or more actuatable work tool assemblies 114.

The one or more canopy-penetrating structures 301 may be formed from a plurality of pieces (e.g., a first half and a second half). The one or more canopy-penetrating structures 301 may be formed from any material known in the art to be suitable for resisting corrosion and/or other environmental damage, including, without limitation, a polymeric material. The one or more canopy-penetrating structures may include one or more openings 339 configured to permit one or more measurements by the more measurement attachments 142. For example, the one or more openings 339 may include a plurality of holes within the one or more canopy-penetrating structures 301 configured to allow a camera to capture one or more images of the environment surrounding the actuatable work tool assembly 114. In another embodiment, the one or more openings 339 may include one or more holes within the one or more canopy-penetrating structures 301 configured to allow a coupling between the one or more cables 129 and an actuatable work tool assembly frame 341. In another embodiment, the one or more openings 339 may be configured to receive the one or more cables 129. For example, the one or more cables 129 may be configured to pass through an interior of the one or more actuatable work tool assemblies 114. It is specifically contemplated that, in some embodiments, the one or more actuatable work tool assemblies 114 may be configured such that the one or more cables 129 may be fixed, and that the one or more actuatable work tool assemblies 114 may be configured to actuate along a length of the one or more cables 129. For example, the one or more actuation systems may include any actuation device known in the art to be suitable for actuation of the one or more actuatable work tool assemblies 114 along the length of the one or more cables 114, including, without limitation, any motor-driven actuation device (e.g., an actuation device containing one or more rubber actuators configured to be actuatably coupled to the one or more cables 129 such that the one or more actuatable work tool assemblies 114 may be actuated along the length).

Figure 3B:
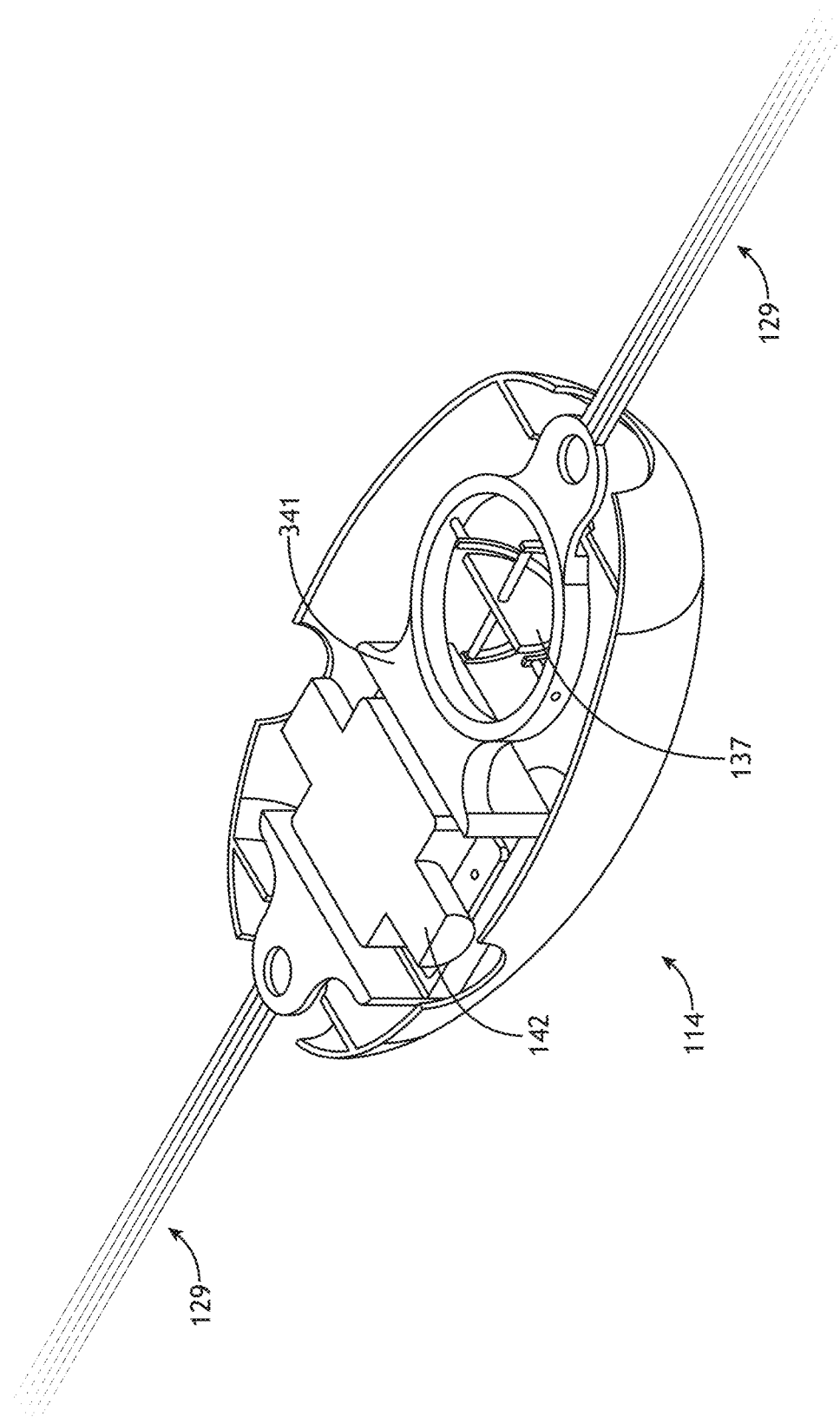
FIG. 3B illustrates an actuatable work tool assembly, in accordance with one or more embodiments of the present disclosure.

FIG. 3B illustrates a cross-sectional view of an actuatable work tool assembly 114, in accordance with one or more embodiments of the present disclosure. In some embodiments, the actuatable work tool assembly 114 may include the actuatable work tool assembly frame 341. The actuatable work tool assembly frame 341 may be configured to hold one or more components of the actuatable work tool assembly 114, including, without limitation, the one or more measurement attachments 142. For example, the actuatable work tool assembly frame 341 may be configured to hold a camera. By way of another example, the actuatable work tool assembly frame 341 may be configured to hold one or more devices configured to provide data regarding the position and/or orientation of the actuatable work tool assembly 114. For example, the actuatable work tool assembly frame 341 may be configured to hold one or more gyroscopes 337 configured to provide data regarding the orientation of the actuatable work tool assembly frame 341 during one or more measurements performed by the actuatable work tool assembly 114. In this regard, the one or more gyroscopes 337 may be communicatively coupled to the controller 124, and the controller 124 may be configured to determine one or more positions and/or orientations of the actuatable work tool assembly 114 based on the data received from the one or more gyroscopes 337.

Figure 3C:
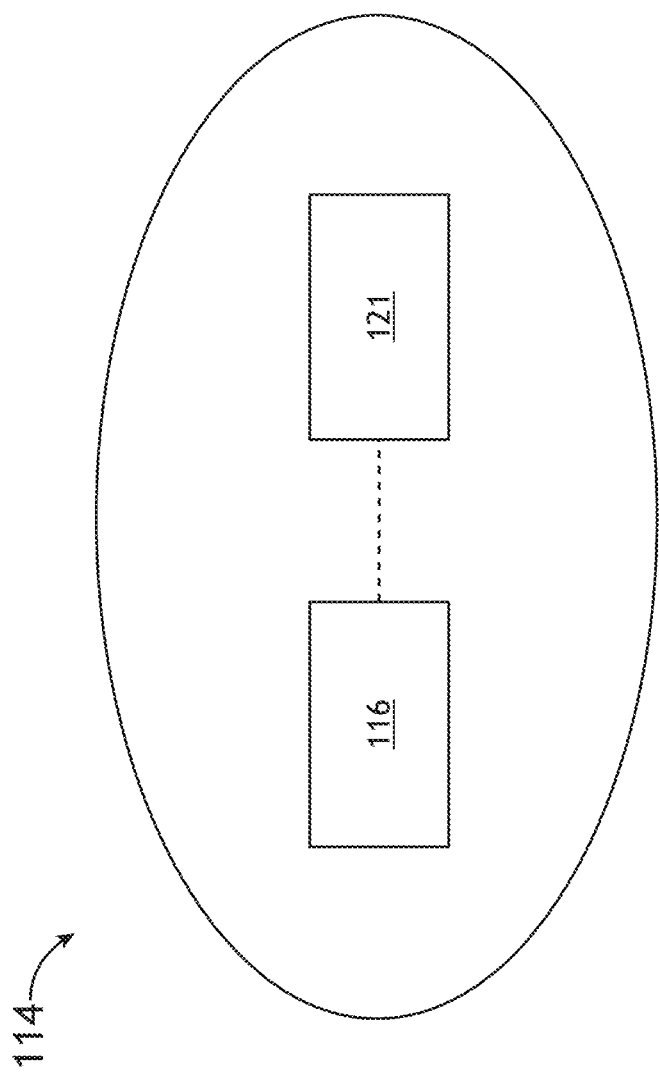
FIG. 3C illustrates an actuatable work tool assembly, in accordance with one or more embodiments of the present disclosure.

FIG. 3C illustrates a simplified block diagram view of an actuatable work tool assembly 114, in accordance with one or more embodiments of the present disclosure. The one or more power units 116 may be disposed within the one or more actuatable work tool assemblies 114. For example, the one or more actuatable work tool assemblies 114 may include a battery. The one or more power units 116 may be electrically coupled to the one or more actuation systems 121, where the one or more actuation systems 121 may be disposed within the one or more actuatable work tool assemblies 114. The one or more power units 116 may be configured to provide electric power to the one or more actuatable work tool assemblies 114 in order to enable the one or more actuatable work tool assemblies 114 to be actuated.

It is noted that the controller 124 may determine one or more positions and/or orientations of the actuatable work tool assembly 114 in order to minimize a time required for the actuatable work tool assembly 114 to capture one or more images of the environment. In this regard, the agricultural system 100 may be configured to quickly capture multiple images of the environment, and may be configured to quickly actuate the one or more actuatable work tool assemblies 114 between the capture of each image.

Figure 3D:
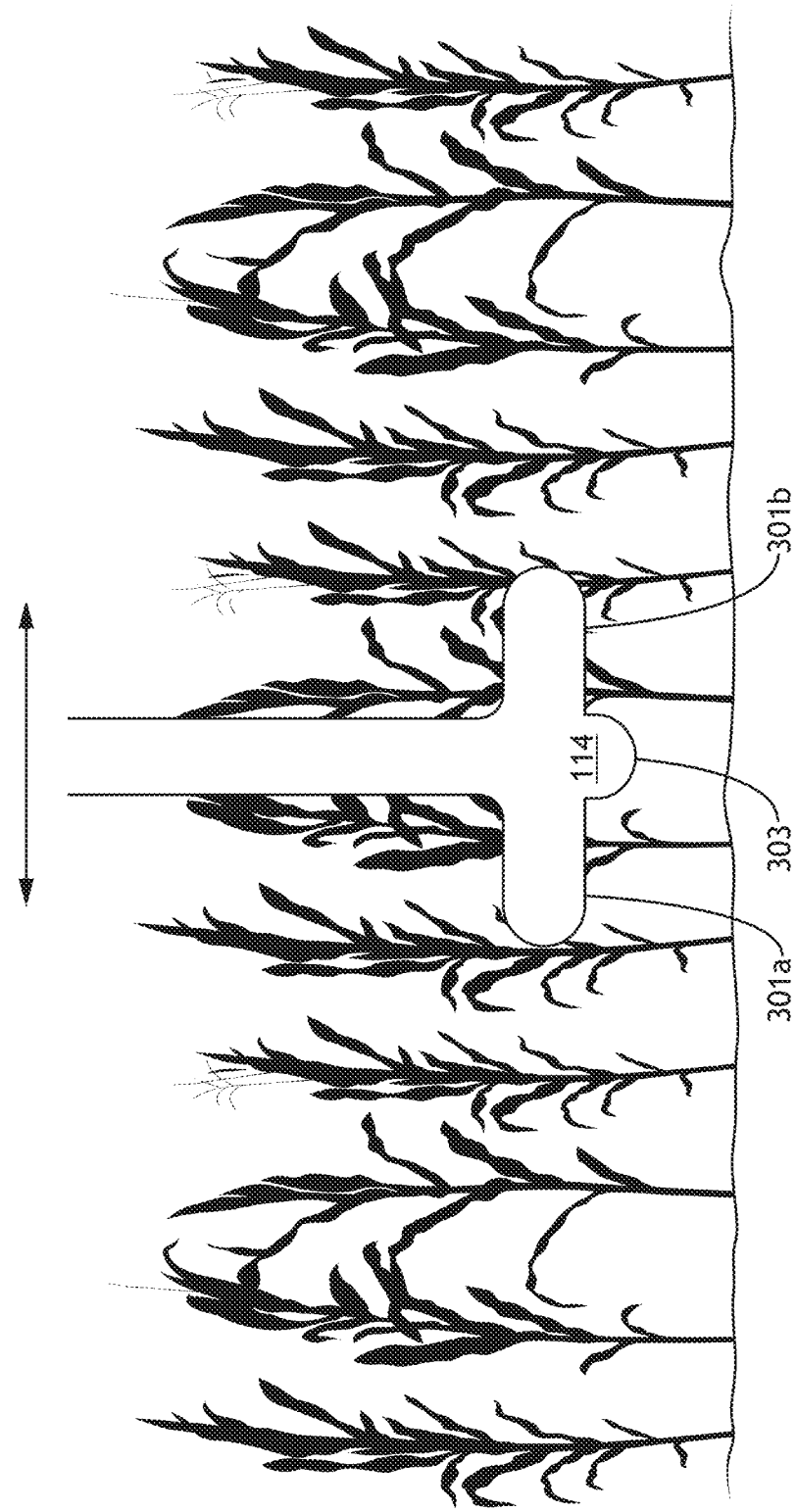
FIG. 3D illustrates an actuatable work tool assembly, in accordance with one or more embodiments of the present disclosure.
Figure 3E:
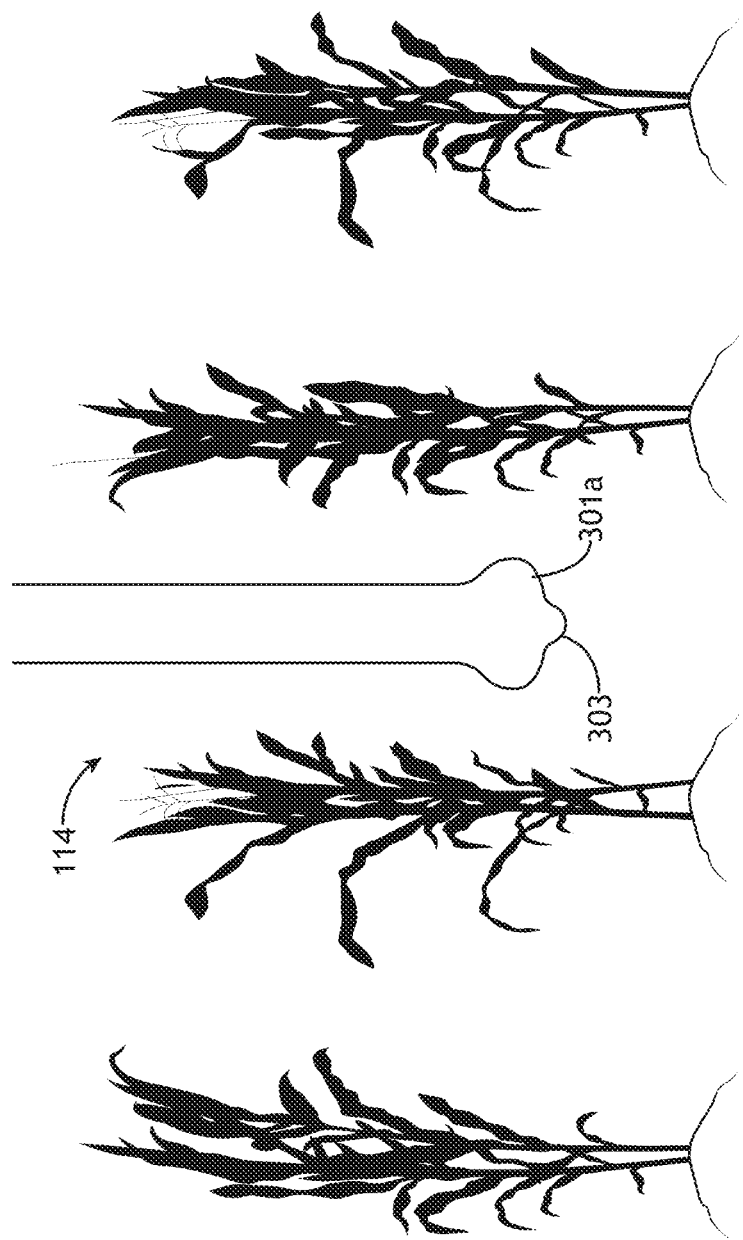
FIG. 3E illustrates an actuatable work tool assembly, in accordance with one or more embodiments of the present disclosure.

FIGS. 3D and 3E illustrate simplified views of an actuatable work tool assembly 114, in accordance with one or more embodiments of the present disclosure. The one or more actuatable work tool assemblies 114 may include a first canopy-penetrating structure 301*a* and a second canopy-penetrating structure 301*b*. In this regard, the one or more actuatable work tool assemblies 114 may be configured for bidirectional actuation through a canopy or body of vegetation. For example, the first canopy-penetrating structure 301*a* may be configured to separate the canopy or body of vegetation during actuation of the one or more work tool assemblies 114 along a first direction, while the second canopy-penetrating structure 301*b* may be configured to separate the canopy or body of vegetation during actuation of the one or more work tool assemblies 114 along a second direction.

The enclosure of the one or more actuatable work tool assemblies 114 may include one or more camera domes 303 configured to protect the one or more measurement attachments 142 from one or more environmental hazards (e.g., moisture, dust, wind, or the like). For example, the one or more camera domes 303 may comprise a watertight enclosure configured to protect the one or more measurement attachments 142 from moisture. The one or more camera domes 303 may be formed from any material suitable for the purposes contemplated by the present disclosure. It is noted that the one or more camera domes 303 may include one or more canopy-penetrating structures 301. In this regard, the one or more camera domes 303 may be configured to permit the one or more actuatable work tool assemblies 114 to penetrate a top portion of the canopy or body of vegetation such that the one or more actuatable work tool assemblies 114 may perform one or more measurements below the top portion. In this regard, it is noted that the one or more actuatable work tool assemblies, in some embodiments 114, may be configured for multi-directional actuation (e.g., actuation along one or more axes).

Figure 3F:
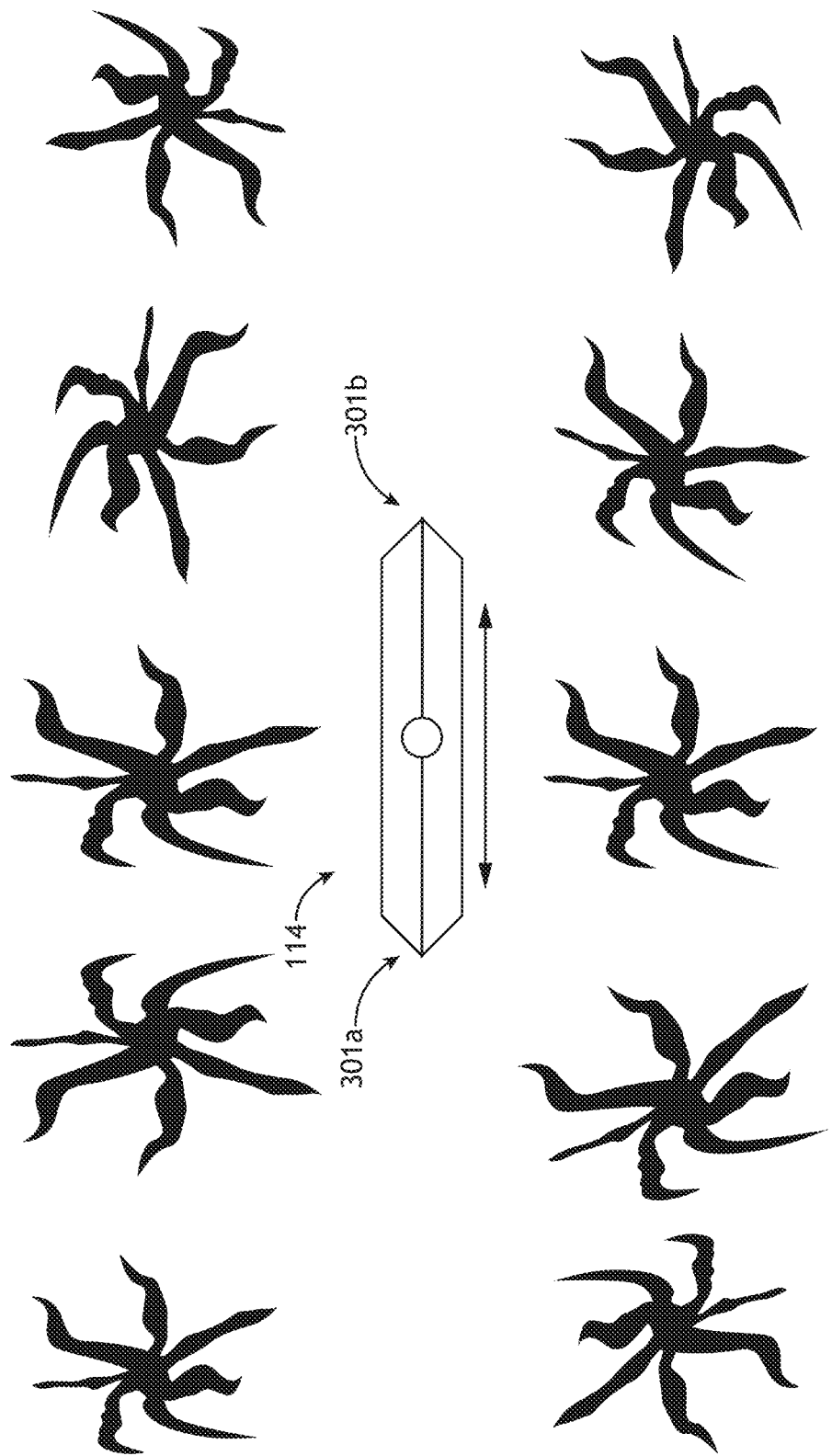
FIG. 3F illustrates an actuatable work tool assembly, in accordance with one or more embodiments of the present disclosure.
Figure 3G:
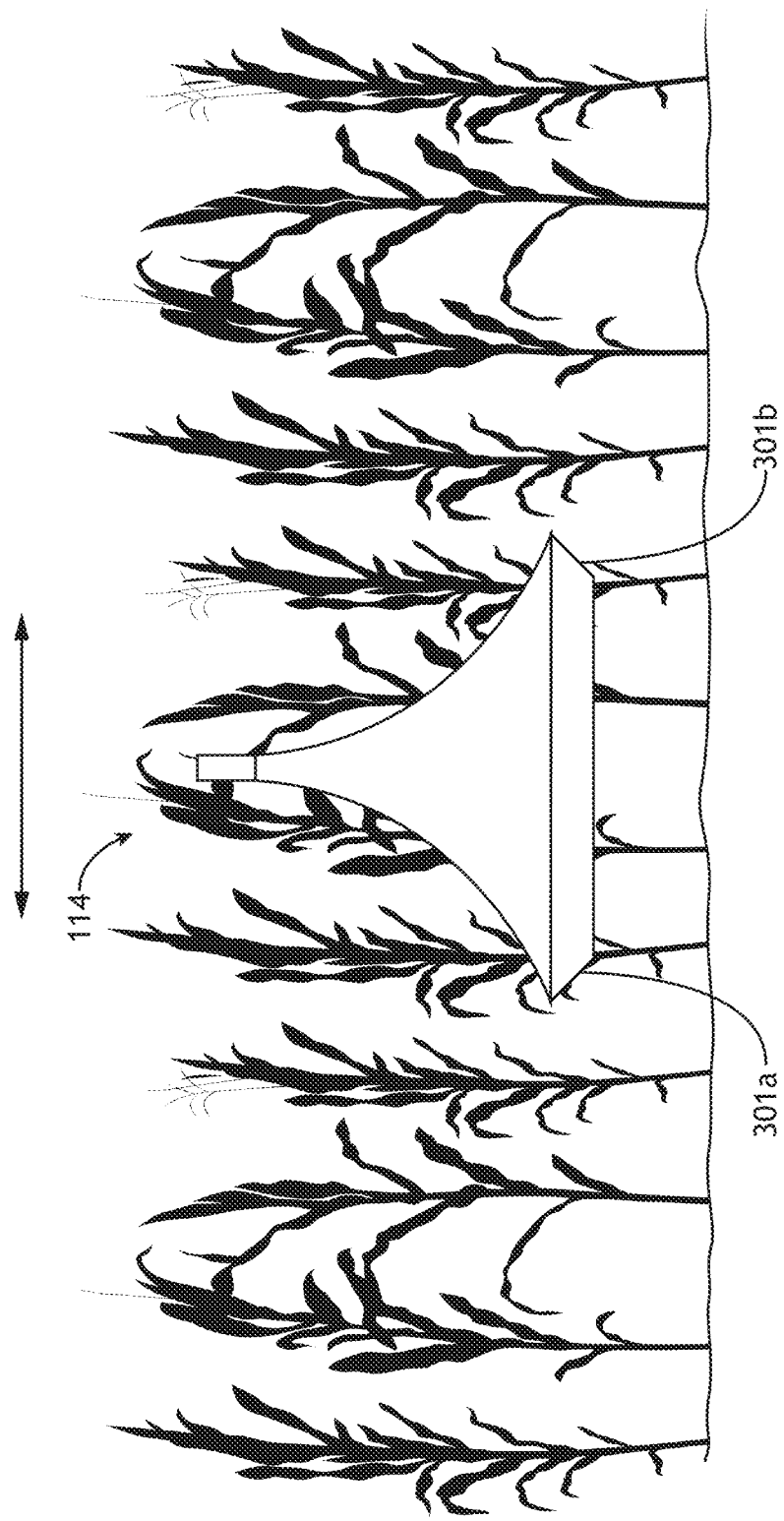
FIG. 3G illustrates an actuatable work tool assembly, in accordance with one or more embodiments of the present disclosure.
Figure 3H:
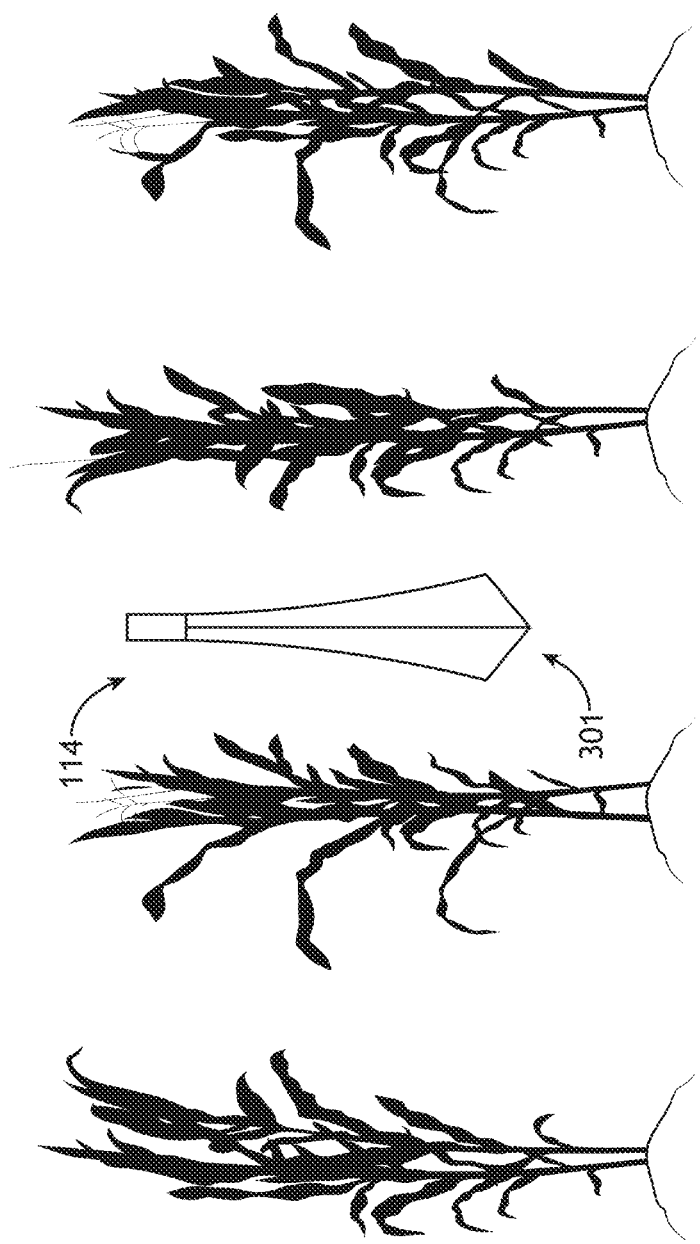
FIG. 3H illustrates an actuatable work tool assembly, in accordance with one or more embodiments of the present disclosure.

FIGS. 3F, 3G, and 3H illustrate simplified views of an actuatable work tool assembly 114, in accordance with one or more embodiments of the present disclosure. FIG. 3F illustrates a top view of the actuatable work tool assembly 114. FIG. 3G illustrates a front view of the actuatable work tool assembly 114. FIG. 3H illustrates a side-view of the actuatable work tool assembly 114. The one or more actuatable work tool assemblies 114 may include a first canopy-penetrating structure 301*a* and a second canopy-penetrating structure 301*b*. In this regard, the one or more actuatable work tool assemblies 114 may be configured for bidirectional actuation through a canopy or body of vegetation. For example, the first canopy-penetrating structure 301*a* may be configured to separate the canopy or body of vegetation during actuation of the one or more work tool assemblies 114 along a first direction, while the second canopy-penetrating structure 301*b* may be configured to separate the canopy or body of vegetation during actuation of the one or more work tool assemblies 114 along a second direction.

It is specifically noted that the scope of the present disclosure with respect to the one or more actuatable work tool assemblies 114 and/or the one or more canopy-penetrating structures 301 is not limited to the shapes shown and described herein. For example, the one or more actuatable work tool assemblies 114 and/or the one or more canopy-penetrating structures may be formed in any shape suitable for the purposes contemplated by the present disclosure.

It is further noted that the embodiments of the present disclosure with respect to the one or more actuatable work tool assemblies 114 are not limited to those embodiments shown and described herein. In this regard, the one or more actuatable work tool assemblies 114 may include one or more additional components not specifically illustrated or described herein. For example, the one or more actuatable work tool assemblies 114 may include any device or system configured to clean one or more portions of the one or more actuatable work tool assemblies 114, including, without limitation, one or more water wiper blade systems configured to clear a volume of liquid from one or more portions of the one or more actuatable work tool assemblies, including, without limitation, the one or more camera domes 303.

FIGS. 4A-4D illustrate a livestock management system 100, in accordance with one or more embodiments of the present disclosure. The livestock management system 100 may be configured for use in any livestock facility known in the art to be suitable for the purposes contemplated by the present disclosure.

Figure 4A:
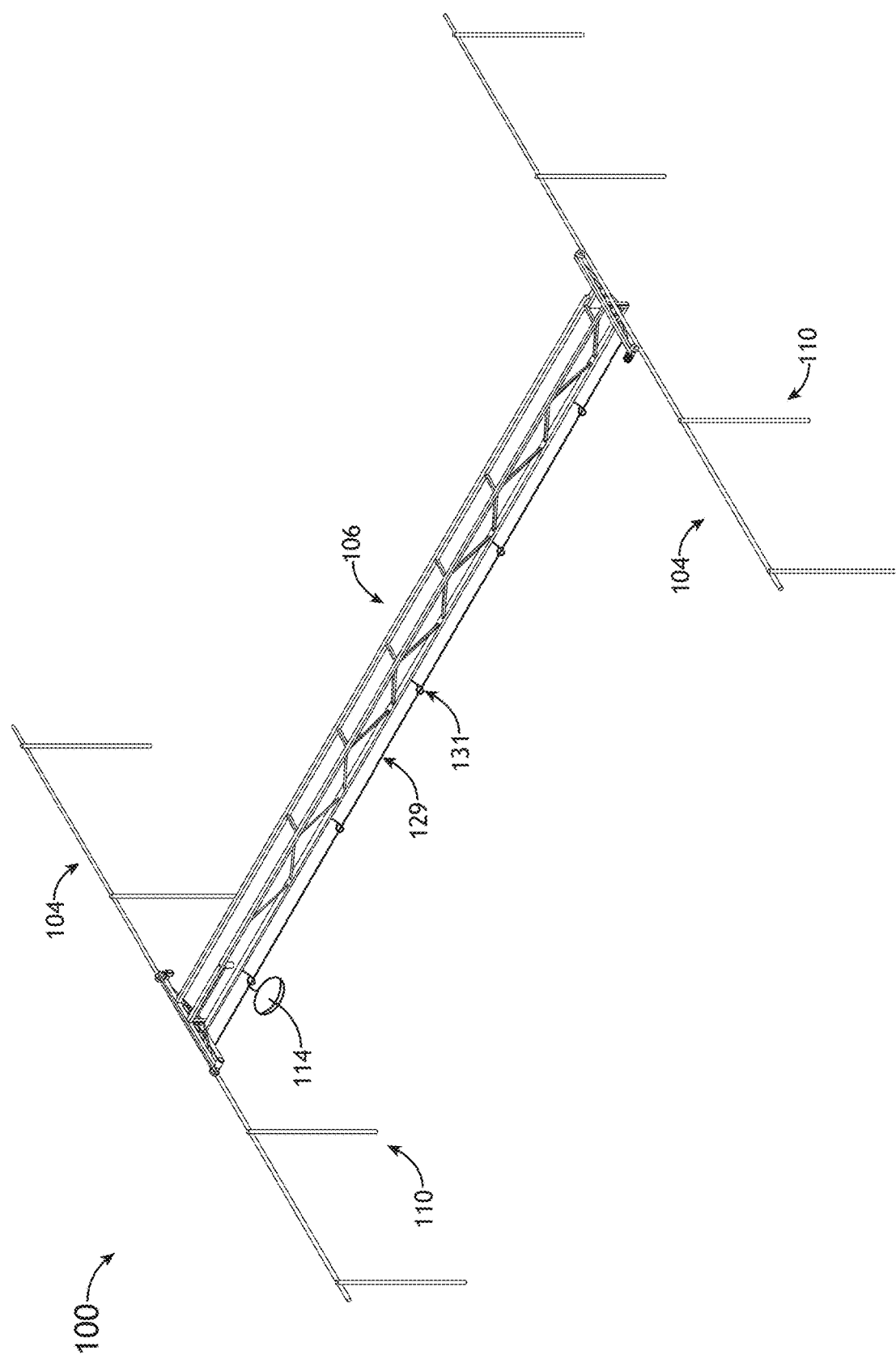
FIG. 4A illustrates a livestock management system, in accordance with one or more embodiments of the present disclosure.

In one embodiment, as shown in FIG. 4A, the support assembly 104 may include one or more support frames 106 and one or more support structures 110. The one or more actuatable work tool assemblies 114 may be coupled to the support assembly 104 via a controlled cable assembly. The controlled cable assembly may include one or more cables 129 couplable to the one or more actuatable work tool assemblies 114. For example, the one or more cables 129 may include one or more galvanized or stainless-steel cables. By way of another example, the one or more cables 129 may be coupled to the support assembly 104 via any coupling method known in the art to be suitable for the purposes contemplated by the present disclosure, including, without limitation, a threaded coupling or a clevis coupling. By way of another example, the one or more cables 129 may be configured to be coupled to a plurality of support assemblies 104 via one or more fixed "t-shaped" connectors. The one or more cables 129 may include a communications cable configured to permit communication between one or more portions of the one or more actuatable work tool assemblies 114 and any other components of the agricultural system 100. In some embodiments, the one or more support frames 106 may be fixed (e.g., as shown in FIG. 4C). In some embodiments, the one or more support frames 106 may be configured to be actuated along the one or more support structures 110.

The cable actuation assembly 127 may be configured to actuate the one or more actuatable work tool assemblies 114 in a multidirectional manner. For example, the cable actuation assembly 127 may be configured to actuate the one or more actuatable work tool assemblies 114 along multiple axes of the agricultural system 100. In this regard, the cable actuation assembly 127 may be configured to actuate the one or more actuatable work tool assemblies 114 to a selected position within the livestock facility such that a measurement of the environment of the livestock facility may be performed.

Figure 4B:
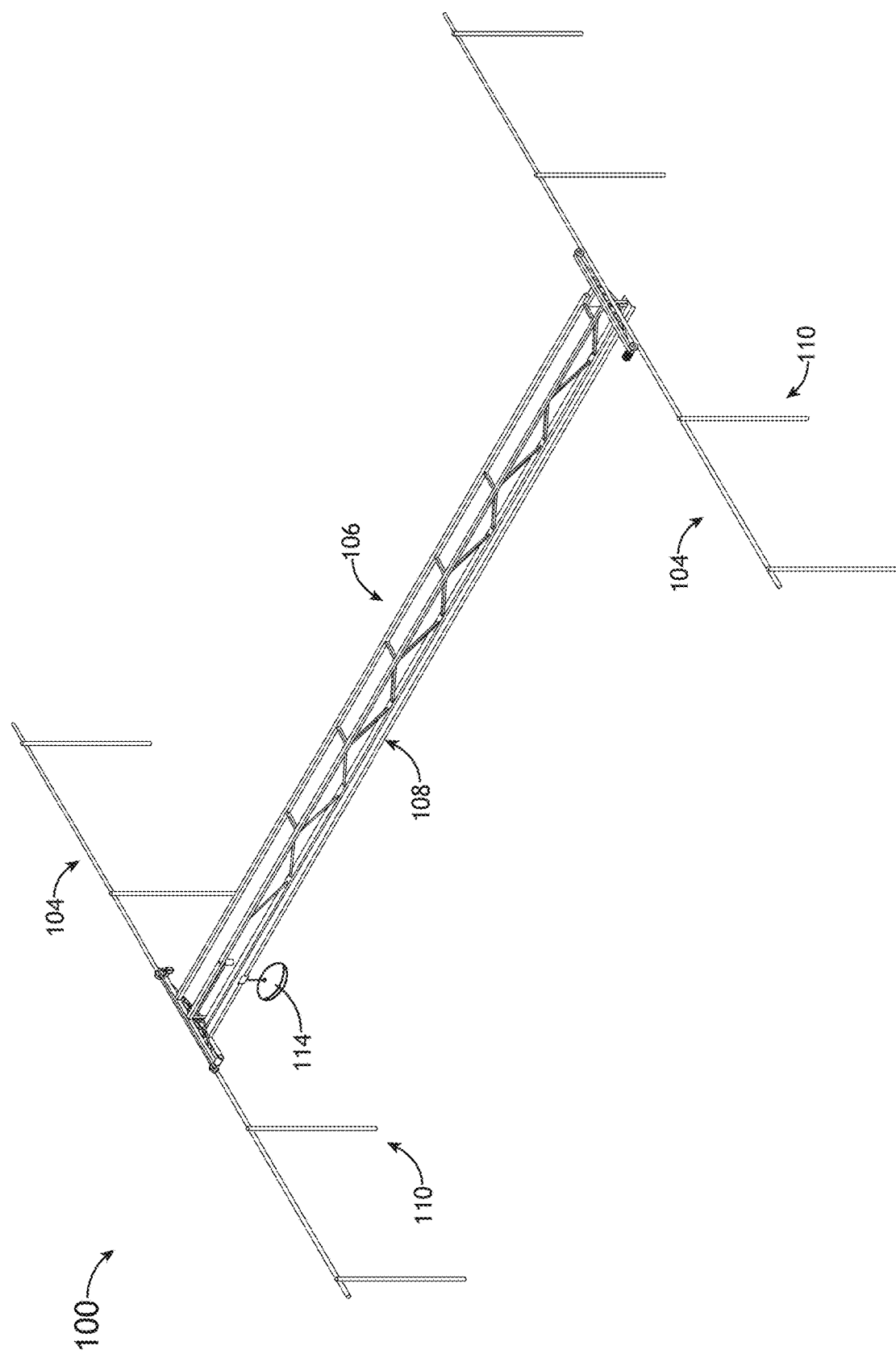
FIG. 4B illustrates a livestock management system, in accordance with one or more embodiments of the present disclosure.
Figure 4C:
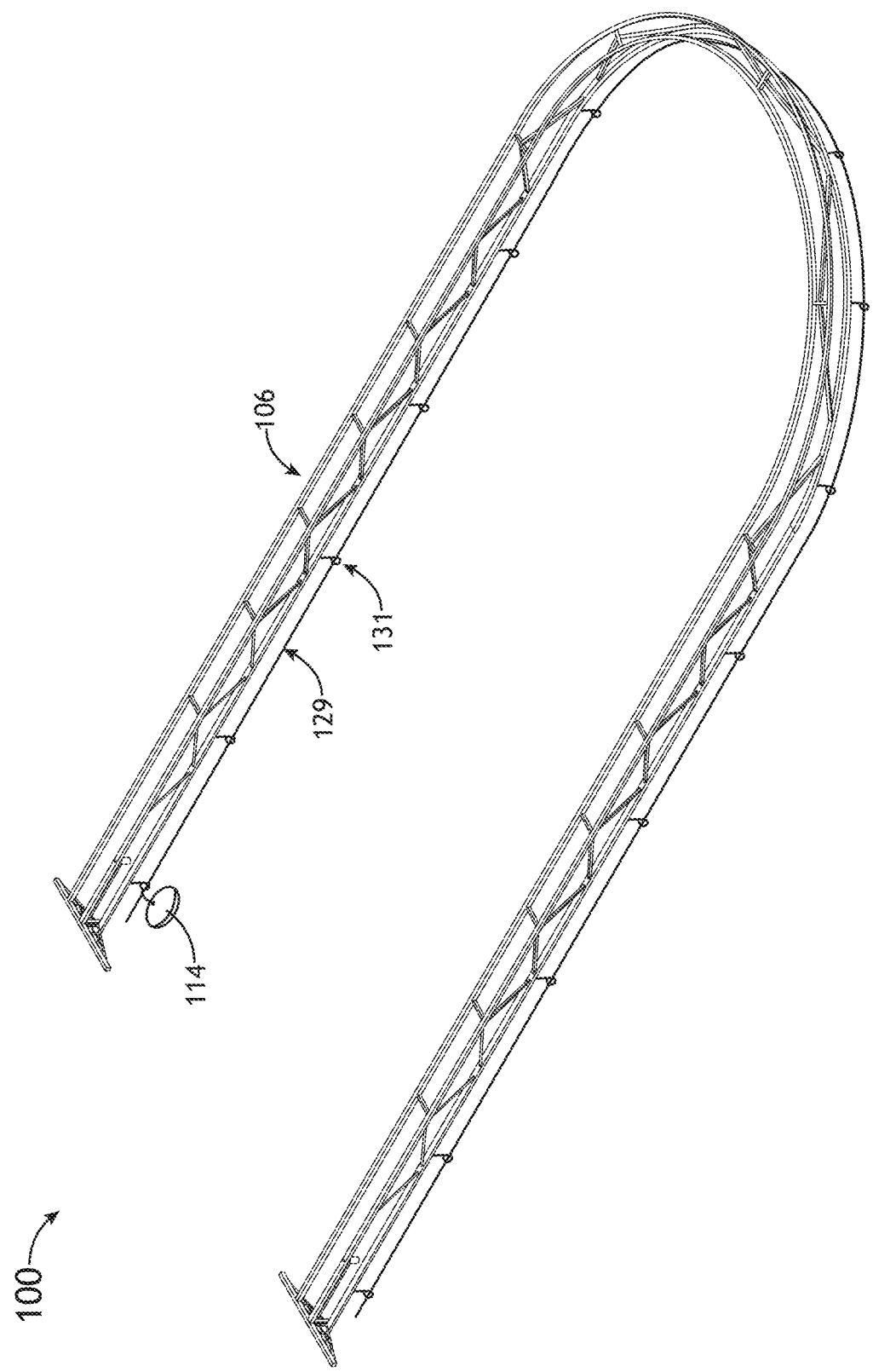
FIG. 4C illustrates a livestock management system, in accordance with one or more embodiments of the present disclosure.

In another embodiment, as shown in FIG. 4B, the support assembly 104 may comprise a gantry assembly disposed within the livestock facility. As noted previously herein, the gantry assembly 102 may include, but is not limited to, a support assembly 104 including one or more support frames 106, one or more work tool rails 108, and one or more support structures 110.

Figure 4D:
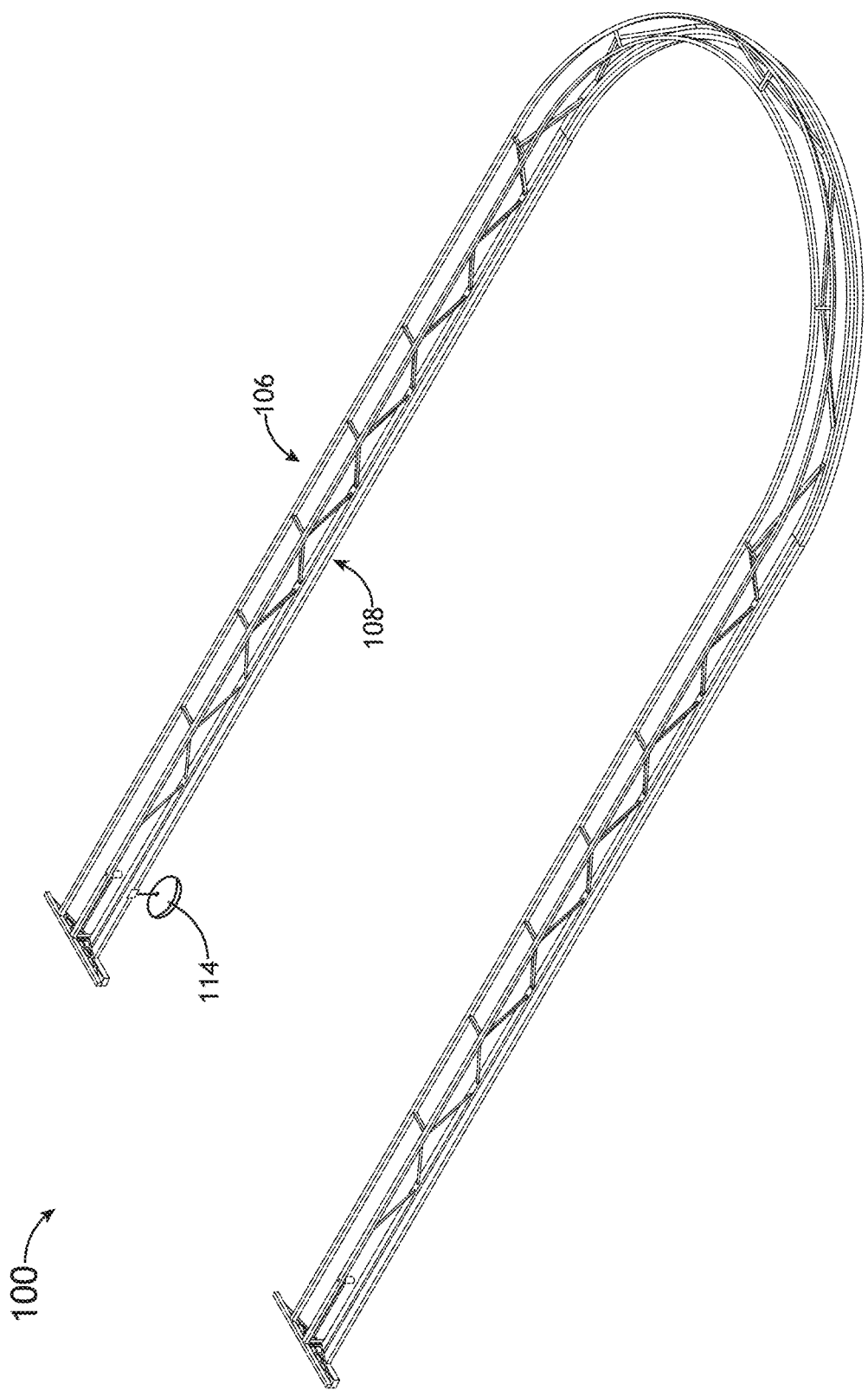
FIG. 4D illustrates a livestock management system, in accordance with one or more embodiments of the present disclosure.

In one embodiment, the one or more support frames 106 and the one or more work tool rails 108 are coupled to one or more support structures 110. For example, the gantry assembly may include a first support structure 110 at a first end and a second support structure 110 at a second end. In another embodiment, each support structure 110 may include one or more propulsion units 112. The one or more propulsion units 112 may be configured to engage and/or be disposed upon one or more portions of the gantry assembly such that the propulsion units 112 may be configured to selectively actuate the gantry assembly along the one or more portions of the gantry assembly. In this regard, the one or more propulsion units 112 may include any propulsion units known in the art including, but not limited to, a friction drive unit (e.g., wheel/tire unit, rollers), direct drive unit (e.g., rack and pinion unit), magnetic drive unit, air powered unit, hydraulic powered unit, and the like. In some embodiments, the gantry assembly and/or the one or more support frames 106 may be fixed (e.g., as shown in FIG. 4D). In some embodiments, the gantry assembly and/or the one or more support frames 106 may be configured to be actuated along the one or more support structures 110.

In another embodiment, the controller 124 is configured to control a direction of travel of one or more portions (e.g., the one or more support frames 106) of the gantry assembly via geo-spatial position in the livestock facility. In this regard, the controller 124 is configured to selectively actuate components of the gantry assembly according to where the gantry assembly may be in a defined geo-space with respect to various objects within the livestock facility (e.g., livestock, objects, other gantry assemblies, structures, and the like).

One or more components of the support assembly 104 may be formed from any lightweight material known in the art. For example, one or more components of the support assembly 104 may be constructed from, but are not limited to, carbon steel, alloy steel, carbon fiber, a carbon fiber-reinforced plastic, or graphene. By way of another, one or more components of the support assembly 104 may be constructed from, but are not limited to, one or more plastic and/or composite materials. By way of another example, one or more components of the support assembly 104 may be constructed from, but are not limited to, one or more lightweight metals (e.g., aluminum) or a 3D printed material. It is noted that the construction of the support assembly 104 is not limited to one or more lightweight materials. For example, one or more components of the support assembly 104 may be formed from one or more non-lightweight materials, such as, but not limited to, steel, iron, and the like.

Furthermore, the support assembly 104 may be fabricated using any shape or technique known in the art. For example, the support assembly 104 may be fabricated by welding the one or more support frames 106 into a truss-type structure. For instance, the truss may have, but is not limited to, a triangular prism shape (i.e., the truss has a triangle cross-section when viewed from the end of the support frame 106. By way of another example, the truss may have, but is not limited to, a rectangular prism shape (e.g., the truss has a square or rectangular cross-section when viewed from the end of the support frame 106). It is noted the truss may have up to an N-sided cross-section (e.g., the truss has an N-side cross-section when viewed from the end of the support frame 106). By way of another example, the support frame 106 may be constructed from one or more curved structures. For instance, at least a portion of the one or more curved structures (i.e., parabolic structures or bow structures) may be arranged in a substantially vertical direction (i.e., 90 degrees from ground). Additionally, at least a portion of the one or more parabolic structures may be arranged in a substantially horizontal direction (e.g. 0 degrees from ground). Additionally, at least a portion of the one or more parabolic structures may be arranged at a selected angle from the ground (e.g., angle ranging from 0.1-90 degrees from ground). It is noted that constructing the support frame 106 with one or more parabolic structures in this fashion will provide additional support for the one or more work tool rails 108, which are described in additional detail further herein.

By way of another example, the support assembly 104 may include single and/or individual tube members, or one or more individual structures coupled together. By way of another example, the support assembly 104 may include components fabricated from one or more extruded materials.

It is specifically noted that embodiments of the present disclosure are not limited to those described and illustrated herein. For example, the agricultural system 100 may be disposed on a mobile device configured to maneuver about the environment. For example, the agricultural system 100 may include any device not fixed to a specific location. By way of another example, the agricultural system 100 may be configured for use on a mobile toolbar in a field (e.g., the agricultural system 100 may comprise a sensing work tool on a mobile toolbar in a field).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C, C++, python, Ruby on Rails, Java, PHP, .NET, or Node.js programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is described herein as a single figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed:

1. An agricultural system comprising:
   a support assembly including one or more support structures;
   one or more propulsion units coupled to the one or more support structures;
   one or more actuatable work tool assemblies, wherein the one or more actuatable work tool assemblies include one or more measurement attachments configured to perform one or more measurements of at least one of one or more objects or one or more regions within an environment;
   one or more actuation systems, wherein the one or more actuation systems are configured to provide actuation of the one or more actuatable work tool assemblies; and
   a controller, wherein the controller includes one or more processors configured to execute a set of program instructions stored in memory, wherein the program instructions are configured to cause the one or more processors to at least:
   direct the one or more actuation systems to actuate the one or more actuatable work tool assemblies to a selected position; and
   direct the one or more actuatable work tool assemblies to perform one or more measurements of at least one of one or more objects or one or more regions within the environment.

2. The agricultural system of claim 1, wherein the support assembly comprises a gantry assembly.

3. The agricultural system of claim 1, wherein the support assembly comprises a controlled cable assembly.

4. The agricultural system of claim 2, wherein the one or more support structures comprise one or more work tool rails coupled to one or more gantry support structures.

5. The agricultural system of claim 4, wherein the gantry assembly comprises a powered gantry.

6. The agricultural system of claim 4, wherein the gantry assembly comprises an unpowered gantry.

7. The agricultural system of claim 4, wherein the one or more actuation systems are disposed on the one or more actuatable work tool assemblies and are coupled to one or more portions of the one or more work tool rails.

8. The agricultural system of claim 3, wherein the controlled cable assembly comprises one or more cables coupled to at least one of the one or more work tool assemblies, one or more cable assembly support structures, or one or more cable actuation assemblies.

9. The agricultural system of claim 8, wherein the one or more actuation systems are configured to provide movement of the one or more actuatable work tool assemblies via the one or more cable actuation assemblies.

10. The agricultural system of claim 9, wherein the one or more cable actuation assemblies comprise at least one of a winch, a sprocket, or a pulley.

11. The agricultural system of claim 1, wherein the one or more measurement attachments comprise one or more camera attachments, one or more anemometer attachments, one or more temperature sensors, one or more relative humidity sensors, one or more evapotranspiration sensors, one or more gas sensors, one or more light sensors, one or more soil moisture sensors, one or more feed level sensors, one or more water level sensors, one or more hyperspectral camera sensors, one or more ranging devices, one or more depth sensors, one or more soil nutrient sensors, one or more crop vigor sensors, one or more yield prediction sensors, one or more insect pest identification sensors, one or more fungus identification sensors, one or more terrain quality sensors, or one or more gully detection sensors.

12. The agricultural system of claim 1, wherein the set of program instructions is configured to cause the one or more processors to:
direct the one or more measurement attachments to obtain at least one measurement data regarding or one or more images of one or more crops within the environment; and
perform a phenotyping analysis based on at least one of the measurement data regarding or the one or more images of the one or more crops.

13. The agricultural system of claim 1, wherein the one or more actuatable work tool assemblies comprise one or more canopy-penetrating structures configured to allow the one or more measurement attachments to be actuated to a position below a canopy of one or more crops within the environment.

14. The agricultural system of claim 1, wherein the one or more actuatable work tool assemblies comprise an enclosure, wherein the enclosure includes a camera dome.

15. The agricultural system of claim 1, wherein the set of program instructions is configured to cause the one or more processors to receive measurement data collected by the one or more measurement attachments and transmit the measurement data to a remote server via a network.

16. The agricultural system of claim 1, wherein the set of program instructions is configured to cause the one or more processors to generate one or more control signals to the one or more measurement attachments.

17. The agricultural system of claim 4, wherein the gantry assembly comprises at least a first work tool rail, a second work tool rail, and a work tool transfer rail, wherein the work tool transfer rail is configured to couple the first work tool rail to the second work tool rail, and wherein the work tool transfer rail is configured to allow actuation of one or more actuatable work tool assemblies between the first work tool rail and the second work tool rail.

18. The agricultural system of claim 1, wherein the one or more actuatable work tool assemblies include one or more power units electrically coupled to one or more components of the one or more actuatable work tool assemblies, and wherein the one or more power units are configured to provide electric power to one or more portions of the actuatable work tool assemblies.

19. The agricultural system of claim 18, wherein the one or more support structures include an electrical distribution system electrically couplable to the one or more actuatable work tool assemblies, and wherein the electrical distribution system is configured to provide electric power to the one or more actuatable work tool assemblies.

20. The agricultural system of claim 1, wherein the agricultural system comprises a center-pivot irrigation system.

21. The agricultural system of claim 1, wherein the agricultural system comprises a lateral irrigation system.

22. The agricultural system of claim 1, wherein the agricultural system comprises a livestock management system.

23. The agricultural system of claim 22, wherein the livestock management system is configured for use in a facility configured to house at least one of swine, poultry, or cattle.

24. The agricultural system of claim 1, wherein the set of program instructions is configured to cause the one or more processors to provide one or more control signals to at least one of a pivot irrigation system, lateral irrigation system, drip irrigation system, a fertilizer application system, a herbicide application system, an insecticide application system, a weed identification system, a curtain system, a ventilation system, an automatic livestock sorting system, an automatic feeding system, an automatic weighing system, or an automatic system configured to provide medicine to one or more animals.

25. The agricultural system of claim 1, further comprising one or more docking stations, wherein the one or more actuatable work tool assemblies are reversibly couplable to the one or more docking stations, and wherein the one or more docking stations are configured to receive, store, and transmit measurement data from the one or more actuatable work tool assemblies to a remote server via a network.

26. The agricultural system of claim 25, wherein the one or more docking stations are coupled to one or more portions of the support assembly, and wherein the one or more docking stations are configured to charge the one or more power units of the one or more actuatable work tool assemblies.

27. An irrigation system comprising:
a support assembly including one or more support structures;
one or more propulsion units coupled to the one or more support structures;
one or more actuatable work tool assemblies, wherein the one or more actuatable work tool assemblies include one or more measurement attachments configured to perform one or more measurements of at least one of one or more objects or one or more regions within an environment;
one or more actuation systems, wherein the one or more actuation systems are configured to provide actuation of the one or more actuatable work tool assemblies; and
a controller, wherein the controller includes one or more processors configured to execute a set of program instructions stored in memory, wherein the program instructions are configured to cause the one or more processors to at least:
direct the one or more actuation systems to actuate the one or more actuatable work tool assemblies to a selected position; and direct the one or more actuatable work tool assemblies to perform one or more measurements of at least one of one or more objects or one or more regions within the environment.

28. A livestock management system, comprising:

a support assembly including one or more support structures;

one or more propulsion units coupled to the one or more support structures;

one or more actuatable work tool assemblies, wherein the one or more actuatable work tool assemblies include one or more measurement attachments configured to perform one or more measurements of at least one of one or more objects or one or more regions within a livestock facility, and wherein the one or more actuatable work tool assemblies include one or more actuatable structures configured to allow the one or more measurement attachments to be actuated to a position below the support assembly;

one or more actuation systems, wherein the one or more actuation systems are configured to provide actuation of the one or more actuatable work tool assemblies; and a controller, wherein the controller includes one or more processors configured to execute a set of program instructions stored in memory, wherein the program instructions are configured to cause the one or more processors to at least:
  direct the one or more actuation systems to actuate the one or more actuatable work tool assemblies to a selected position; and
  direct the one or more actuatable work tool assemblies to perform one or more measurements of at least one of one or more objects or one or more regions within the livestock facility.

* * * * *